(12) United States Patent
Plumer et al.

(10) Patent No.: US 6,934,931 B2
(45) Date of Patent: Aug. 23, 2005

(54) SYSTEM AND METHOD FOR ENTERPRISE MODELING, OPTIMIZATION AND CONTROL

(75) Inventors: Edward Stanley Plumer, Georgetown, TX (US); Bijan Sayyar-Rodsari, Austin, TX (US); Carl Anthony Schweiger, Austin, TX (US); Ralph Bruce Ferguson, II, Round Rock, TX (US); William Douglas Johnson, Austin, TX (US); Celso Axelrud, Austin, TX (US)

(73) Assignee: Pavilion Technologies, Inc., Austin, TX (US)

( * ) Notice: Subject to any disclaimer, the term of this patent is extended or adjusted under 35 U.S.C. 154(b) by 795 days.

(21) Appl. No.: 09/827,838

(22) Filed: Apr. 5, 2001

(65) Prior Publication Data

US 2001/0049595 A1 Dec. 6, 2001

Related U.S. Application Data

(60) Provisional application No. 60/194,914, filed on Apr. 5, 2000.

(51) Int. Cl.[7] ............................ G06F 9/44; G05B 13/02
(52) U.S. Cl. ....................... 717/104; 717/105; 717/106; 717/108; 700/28; 700/31; 700/29
(58) Field of Search ............................... 717/104, 105, 717/106, 108; 700/28, 31, 29

(56) References Cited

U.S. PATENT DOCUMENTS

| | | | | |
|---|---|---|---|---|
| 4,860,204 | A | | 8/1989 | Gendron et al. |
| 5,691,895 | A | * | 11/1997 | Kurtzberg et al. ............ 700/29 |
| 5,890,133 | A | * | 3/1999 | Ernst ............................. 707/2 |
| 6,112,126 | A | * | 8/2000 | Hales et al. ................... 700/29 |
| 6,182,014 | B1 | * | 1/2001 | Kenyon et al. ............... 702/14 |
| 6,292,810 | B1 | * | 9/2001 | Richards ..................... 707/100 |
| 6,411,922 | B1 | * | 6/2002 | Clark et al. ..................... 703/2 |
| 6,434,435 | B1 | * | 8/2002 | Tubel et al. .................. 700/30 |
| 6,442,512 | B1 | * | 8/2002 | Sengupta et al. .............. 703/6 |
| 6,535,795 | B1 | * | 3/2003 | Schroeder et al. .......... 700/266 |
| 6,560,501 | B1 | * | 5/2003 | Walser et al. ................. 700/99 |
| 6,731,998 | B2 | * | 5/2004 | Walser et al. ................. 700/99 |
| 6,778,863 | B1 | * | 8/2004 | Lienhard et al. ............. 700/32 |

OTHER PUBLICATIONS

International Search Report, Application No. PCT/US01/11214, mailed Nov. 28, 2002.
Pyarali I et al. "Uning Principle Patterns to Optimize Real–Time Orbs" IEEE Concurrency, IEEE Service Center, vol. 8, No. 1, Jan. 2000 pp. 16–25, XP000920102.

* cited by examiner

*Primary Examiner*—Todd Ingberg
*Assistant Examiner*—Qamrun Nahar
(74) *Attorney, Agent, or Firm*—Meyertons Hood Kivlin Kowert & Goetzel P.C.

(57) ABSTRACT

A system and method for performing modeling, prediction, optimization, and control, including an enterprise wide framework for constructing modeling, optimization, and control solutions. The framework includes a plurality of base classes that may be used to create primitive software objects. These objects may then be combined to create optimization and/or control solutions. The distributed event-driven component architecture allows much greater flexibility and power in creating, deploying, and modifying modeling, optimization and control solutions. The system also includes various techniques for performing improved modeling, optimization, and control, as well as improved scheduling and control. For example, the system may include a combination of batch and continuous processing frameworks, and a unified hybrid modeling framework which allows encapsulation and composition of different model types, such as first principles models and empirical models. The system further includes an integrated process scheduling solution referred to as process coordinator that seamlessly incorporates the capabilities of advanced control and execution into a real time event triggered optimal scheduling solution.

55 Claims, 29 Drawing Sheets

Events Between Enterprises

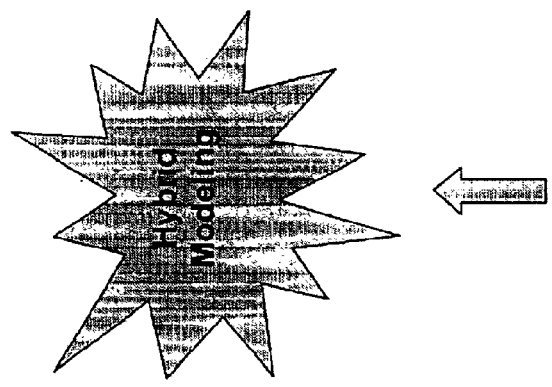
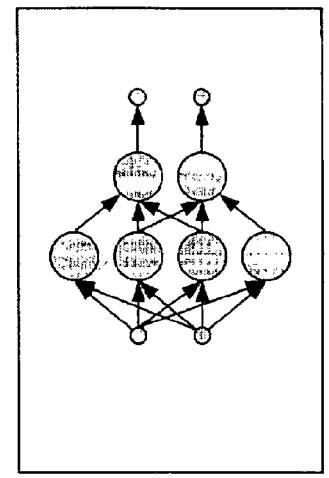
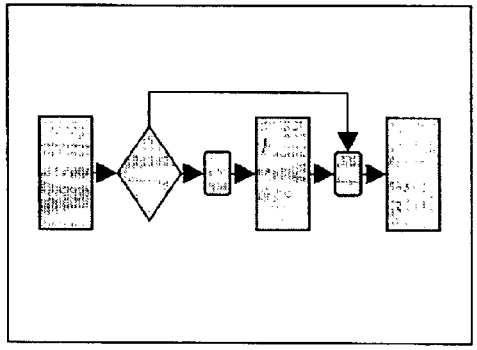
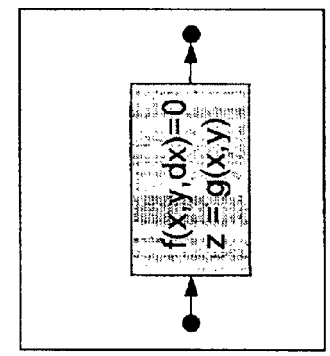
*Figure 11*

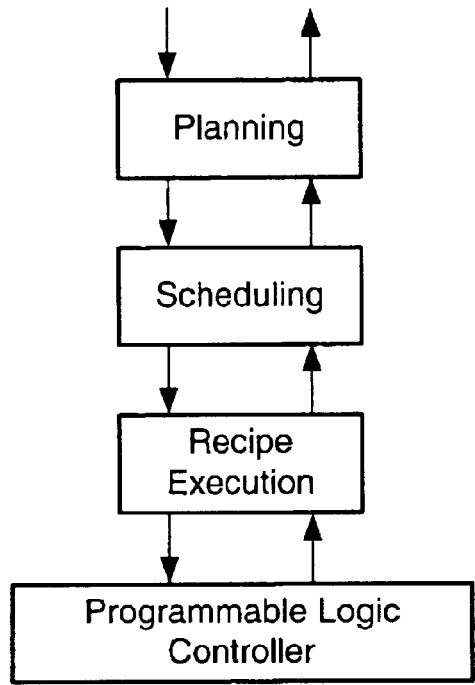 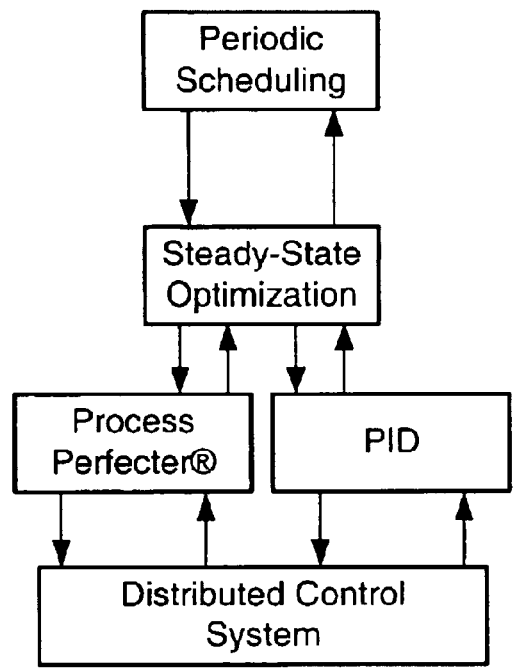
Typical Batch Operation    Typical Continuous Operation
Examples of traditional
decision-making hierarchies
*Figure 13*
*(Prior Art)*

Flexible decision-making hierarchy

Non-hierarchy decision-making network

Digester line

Embedded Data Processing

*Aggregation of models and Decision-Engines allows processing to be embedded within a controller ...*

Embedded Processing for :
- Non-Linear transformation
- Feature creation
- Process estimation (VOA®)
- Error handling

SYSTEM AND METHOD FOR ENTERPRISE MODELING, OPTIMIZATION AND CONTROL

PRIORITY DATA

This application claims benefit of priority of U.S. provisional application Ser. No. 60/194,914 titled "System and Method for Enterprise Modeling, Optimization and Control" filed on Apr. 5, 2000, whose inventors were Edward Stanley Plumer, Bijan Sayyar-Rodsari, Carl Anthony Schweiger, Ralph Bruce Ferguson, II, Mark Ernest Gerules, William Douglas Johnson, and Celso Axelrud

BACKGROUND OF THE INVENTION

1. Field of the Invention

The present invention generally relates to the fields of modeling, optimization, and control. More particularly, the present invention relates to providing an enterprise wide framework for constructing modeling, optimization, and control solutions. The present invention further relates to various techniques for performing improved modeling, optimization, and control, as well as improved scheduling and control.

2. Description of the Related Art

Numerous industries are in the midst of a technological revolution. Throughout today's businesses, information is being made available from diverse sources at a rapid rate. In addition, abundant amounts of historical data from these sources are accumulating but are not being fully leveraged. Customers expect immediate responses and demand the highest quality products and services. To remain competitive, businesses must be able to operate optimally while fulfilling the customers' needs.

The need to operate optimally requires that businesses be much more flexible, have immediate access to different forms of information throughout the enterprise, and be able to use this information to solve problems in real time. A business must be able to utilize the information effectively and react to the information as it becomes available rather than waiting for it to appear in periodic reports. The problem is that the information comes from different areas of the business, has different meaning to different levels of the business operation, and is utilized in different ways. The business must be able to gather information, analyze the information, utilize the information, and execute decisions all in an optimal manner with respect to the entire business in order for it to operate most profitably.

Tools have been developed to improve separate aspects of business operations. Examples include tools for supply chain management and advanced process control. However, these tools applied in isolation do not solve the enterprise-wide problems. An enterprise-wide solution is one that views the business as a whole. Although businesses have tried to integrate different individual solutions to achieve an enterprise-wide solution, these attempts have failed.

Integration of separate solutions into a single business solution is often misrepresented. The benefit of integration comes not from loose bridging between disjoint applications but rather from designing, from the beginning, tight integration of different applications. For example, one decision process cannot produce an optimal decision without knowing both the state of the process that it affects and the ramifications of that decision on the dependent processes.

Any successful solution to the enterprise-wide problem should have an integrated architecture that combines many diverse technologies into a unified framework. An enterprise-wide solution should have extensive information-handling capabilities, a complete set of automatic decision-making tools, and a flexible architecture that addresses the broad scope of problems faced throughout the enterprise.

FIG. 1 illustrates the concept of automated decision making according to the prior art. In automated decision making, it is presumed that a process or system exists upon which decisions are to be made. Part of the automated decision making process is to collect data, e.g., historical data of that process, and use this information to build knowledge or information about how the process behaves. This learning or knowledge may be continually added to or refined as the process is controlled. The information or knowledge that is gathered over time can then be used to perform intelligent decision making. For example, the knowledge about how the process behaves can be combined with goals and objectives of how the process is desired to behave in order to generate actions that can be used to manipulate the behavior of the process or system. Thus, a model of the system or process can be used in addition to a solver or optimizer that optimizes the process according to a desired problem formulation or objective function.

FIG. 2 is a flowchart diagram generally illustrating the prior art method of creating and using models and optimization procedures to model and/or control a process. As shown, in step 202 the method involves gathering historical data which describes the process. This historical data may comprise a combination of inputs and the resulting outputs when these inputs are applied to the respective process. This historical data may be gathered in many and various ways. Typically, large amounts of historical data are available for most processes or enterprises.

In step 204 the method may preprocess the historical data. The preprocessing may occur for several reasons. For example, preprocessing may be performed to manipulate or remove error conditions or missing data, or accommodate data points that are marked as bad or erroneous. Preprocessing may also be performed to filter out noise and unwanted data. Further, preprocessing of the data may be performed because in some cases the actual variables in the data are themselves awkward in modeling. For example, where the variables are temperature 1 and temperature 2, the physical model may be much more related to the ratio between the temperatures. Thus, rather than apply temperature 1 and temperature 2 to the model, the data may be processed to create a synthetic variable which is the ratio of the two temperature values, and the model may be used against the ratio.

In step 206 the model may be created and/or trained. This step may involve several steps. First, a representation of the model may be chosen, e.g., choosing a linear model or nonlinear model. If the model is a nonlinear model, the model may be a neural net structure. Further, the neural net structure may be a fully connected neural net or a partly connected neural net. After the model has been selected, a training algorithm may be applied to the model using the historical data, e.g., to train the neural net. Finally, the method may verify the success of this training to determine whether the model actually corresponds to the process being modeled.

In step 208 the model is typically analyzed. This may involve applying various tools to the model to discover its behavior.

Finally, in step 210, the model may be deployed in the "real world" to model, predict, optimize, or control the respective process. The model may be deployed in any of various manners. For example, the model may be deployed simply to perform predictions, which involves specifying various inputs and using the model to predict the outputs. Alternatively, the model may be employed with a problem formulation, e.g., an objective function, and a solver or optimizer.

FIG. 3 illustrates the traditional prior art approach to scheduling/optimization problems. FIG. 3 is a graph which illustrates various types of decisions and the prior art methods typically used in making these decisions. The graph has two axes as shown. The X axis represents the process and decision type. The X axis represents the process type ranging from continuous processes at the origin, to batch processes, and then to discrete processes. In a continuous process, material is continuously flowing through a system, and the automation solution may be continuously gathering measurements and continuously making decisions. A batch process presumes that the process occurs in batches. The Y axis represents the scope and resolution of the decisions being made. At the origin, the scope and resolution of the decisions are local involving very simple decisions. As Y increases decisions become more complex, until at the highest point of the Y axis the system involves planning the strategy of a whole enterprise.

As shown in FIG. 3, prior art solutions applied in this matrix are typically very distinct in nature. For example, control solutions in a continuous world and a control solution in a batch world have very little common software or common representation. Rather, these are typically different products. This limits the ability to create more interesting and intelligent solutions to various problems.

As shown, the prior art approach has typically used an "islands of technology" approach comprising separate applications, e.g., a separate scheduler application, a separate recipe execution application, and a separate controller application. A solution provider may then attempt to combine these separate applications using a form of "glue logic" that enables some forms of primitive communication. One of the drawbacks with this traditional approach is that the applications generally can only exchange basic, static information. In addition, these different high-level applications typically have differences in modeling, framework, communication, visualization, and execution, and lack adequate intercommunication to provide a true enterprise-wide solution.

Thus, the traditional prior art approach to decision making across the enterprise may be referred to as "system integration". The prior art method presumes different pieces of software that may perform different functions, such as continuous control, batch control, optimization, scheduling, etc., and these different pieces are "glued together" to attempt to provide an enterprise solution. In addition, as mentioned above, each of these different applications cannot take advantage of all of the enterprise data which would be desirable to optimize the entire enterprise.

Therefore, an improved system and method are desired for providing a modeling, optimization, and control system. An improved system and method are also desired for providing various improved modeling, optimization, and control techniques.

SUMMARY OF THE INVENTION

The present invention comprises various embodiments of a system and method for performing modeling, prediction, optimization, and control. In one embodiment, the present invention includes an enterprise wide framework for constructing modeling, optimization, and control solutions. The framework includes a distributed event-driven component architecture which allows much greater flexibility and power in creating, deploying, and modifying modeling, optimization and control solutions.

In another embodiment, the present invention includes various techniques for performing improved modeling, optimization, and control, as well as improved scheduling and control. For example, the system may include a combination of batch and continuous processing frameworks, and a unified hybrid modeling framework which allows encapsulation and composition of different model types, such as first principles models and empirical models. The system may further include a more flexible configuration of the decision-making hierarchy.

Another embodiment of the invention includes an integrated process scheduling solution referred to as "process coordinator". In one embodiment, the process coordinator is designed as an enterprise scheduling/control application that seamlessly incorporates the capabilities of advanced control and execution into a real time event triggered optimal scheduling solution. The process coordinator of this embodiment includes a number of innovations, including schedules based on real time information, unification of scheduling and control tasks, and blending of batch and continuous representations. The process coordinator system may thus operate to combine scheduling and control into a powerful hybrid environment. This operates to provide a more enterprise-wide view of the complete solution or system, enabling more intelligent scheduling and control.

BRIEF DESCRIPTION OF THE DRAWINGS

A better understanding of the present invention can be obtained when the following detailed description of the preferred embodiment is considered in conjunction with the following drawings, in which:

FIG. 11 illustrates the unified modeling framework according to one embodiment;

FIG. 13 illustrates two examples of traditional decision-making hierarchies;

Figure 1:
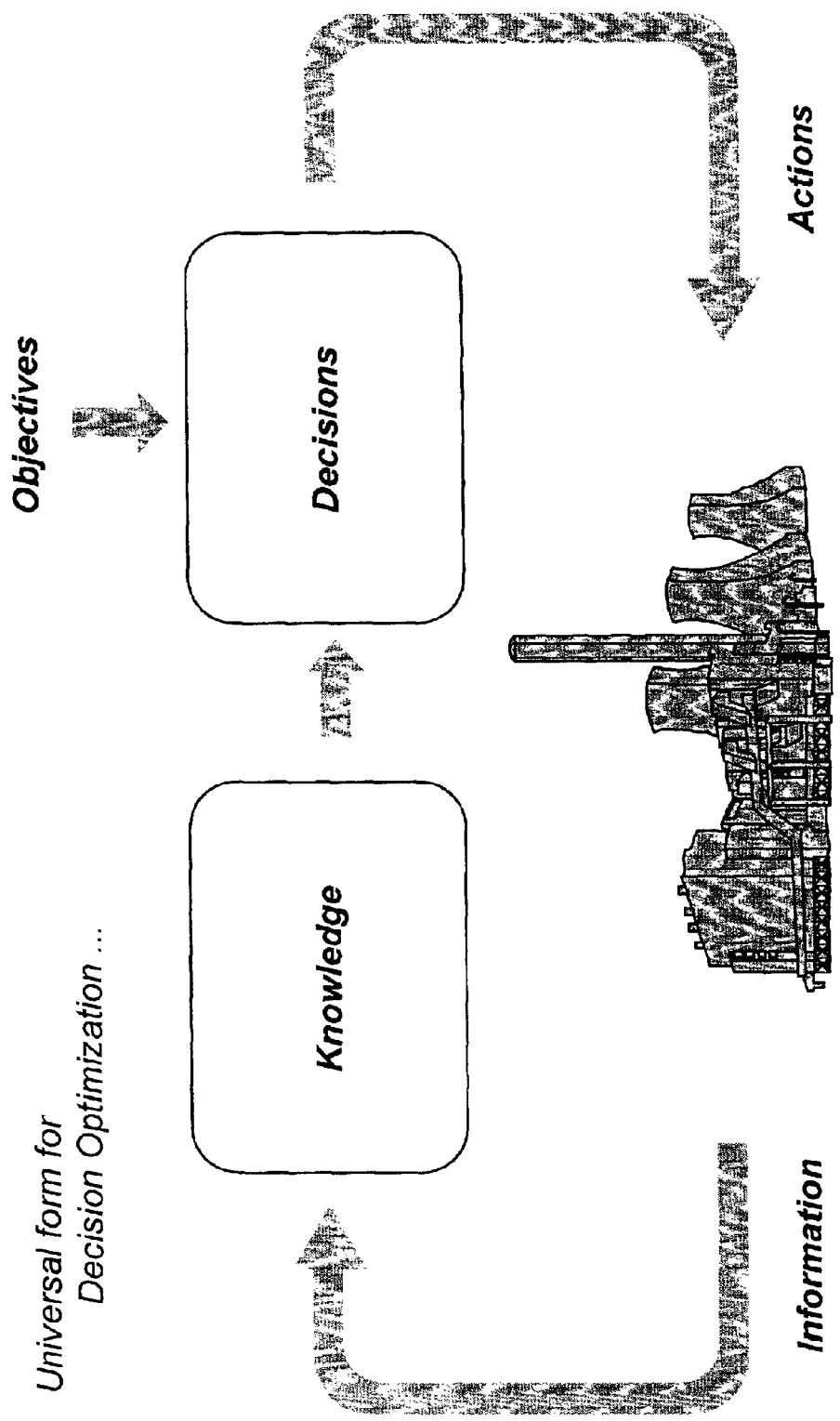
FIG. 1 illustrates the concept of automated decision making according to the prior art.
Figure 2:
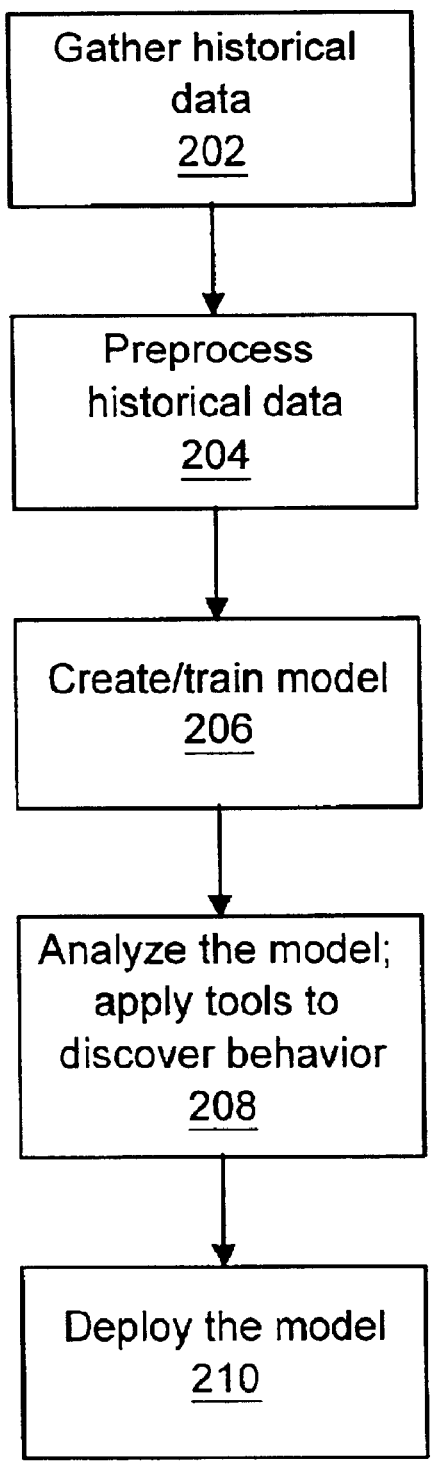
FIG. 2 is a flowchart diagram generally illustrating the prior art method of creating and using models and optimization procedures to model and/or control a process.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE EMBODIMENTS

Incorporation by Reference

U.S. provisional application Ser. No. 60/194,914 titled "System and Method for Enterprise Modeling, Optimization and Control" filed on Apr. 5, 2000 is hereby incorporated by reference in its entirety as though fully and completely set forth herein.

Figure 4:
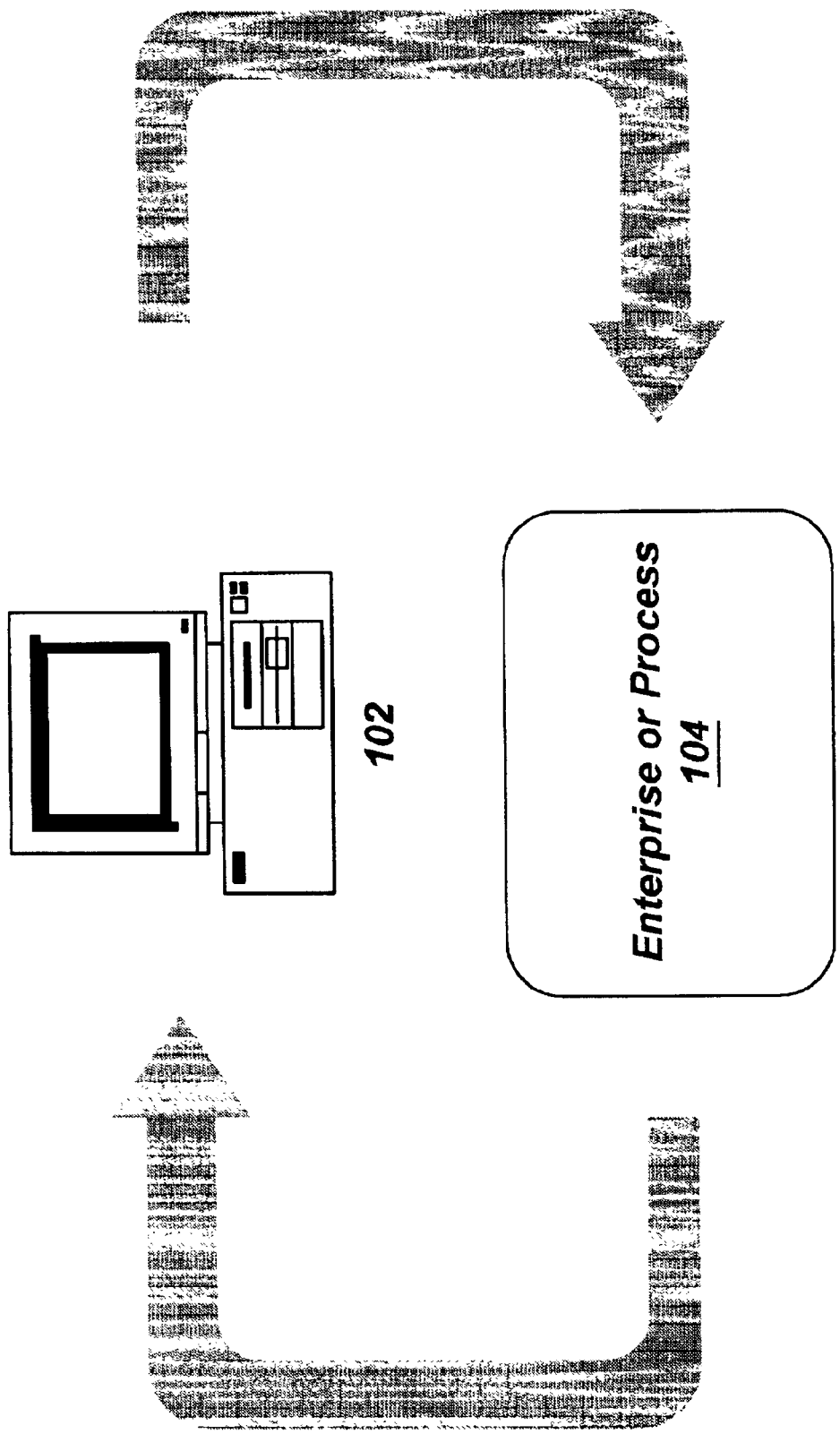
FIG. 4 illustrates a simplified and exemplary view of one embodiment of a system according to the present invention.

FIG. 4—Exemplary System

FIG. 4 illustrates a simplified and exemplary view of one embodiment of a system according to the present invention. As shown, the system may include one or more computer systems 102 which interact with a process, system or enterprise 104 being modeled, optimized and/or controlled. The computer system 102 may represent any of various types of computer systems or networks of computer systems which execute software program(s) according to various embodiments of the invention. The software program(s) may perform various aspects of modeling, prediction, optimization and/or control of the process 104.

As noted above, the process 104 may be any of various types of process, system or enterprise that may be modeled, predicted, optimized and/or controlled, and element 104 is referred to generally herein as a process for convenience. Examples of the process 104 include a manufacturing process, a chemical process, financial services, a supply chain process, an e-commerce process, such as a business-to-consumer e-commerce process or a business-to business e-commerce process, a business-to business e-commerce marketplace, etc. In the following discussion, the process 104 is considered to be a manufacturing or automation process. However, this is not intended to limit the invention, it being noted that the systems and methods described herein may be readily used in performing modeling, optimization and control of any type of process, system or enterprise.

For example, with respect to a business-to business e-commerce marketplace process, the computer system(s) may execute software which optimizes various business transactions held in an electronic forum.

Thus, the system and method may provide an environment for the decision making process of gathering data, accumulating knowledge, and creation of models of the process for predictive modeling or control. The system and method may further provide an environment for making optimal decisions using an optimization solver, and carrying out those decisions, e.g., to control the enterprise, which may be applied to a number of different applications such as automation, control, financial services, electronic commerce, etc.

The one or more computer systems 102 preferably include a memory medium on which computer programs according to the present invention may be stored. The term "memory medium" is intended to include various types of memory or storage, including an installation medium, e.g., a CD-ROM, or floppy disks 104; a computer system memory or random access memory such as DRAM, SRAM, EDO RAM, Rambus RAM, etc.; or a non-volatile memory such as a magnetic medium, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution.

Also, the computer system(s) 102 may take various forms, including a personal computer system, mainframe computer system, workstation, network appliance, Internet appliance or other device. In general, the term "computer system" can be broadly defined to encompass any device having a processor which executes instructions from a memory medium.

The memory medium preferably stores one or more software programs for performing various aspects of modeling, prediction, optimization and/or control of the process 104. The software program(s) are preferably implemented using component-based techniques and/or object-oriented techniques. For example, the software program may be implemented using ActiveX controls, C++ objects, Java objects, Microsoft Foundation Classes (WFC), or other technologies or methodologies, as desired. A CPU or processor executing code and data from the memory medium comprises a means for creating and executing the software program according to the methods or flowcharts described below.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

One embodiment of the present invention provides a new architecture for providing software classes and objects or components for performing various aspects of modeling, prediction, optimization and/or control of a process, such as process 104. This new architecture utilizes a set of component primitives which comprise reusable and configurable components that can be assembled in different ways to provide various modeling, optimization, control and decision solutions. Thus these components can be constructed or built in different ways to provide different higher level solutions. Thus, the components can be applied as necessary to provide a modeling and optimization solution as appropriate for the situation or enterprise. Thus, the system does not include predefined high-level solutions like a scheduler, controller, estimator, etc. Rather, the components are primitives that can be used to construct different types of high-level solutions such as these.

Figure 5:
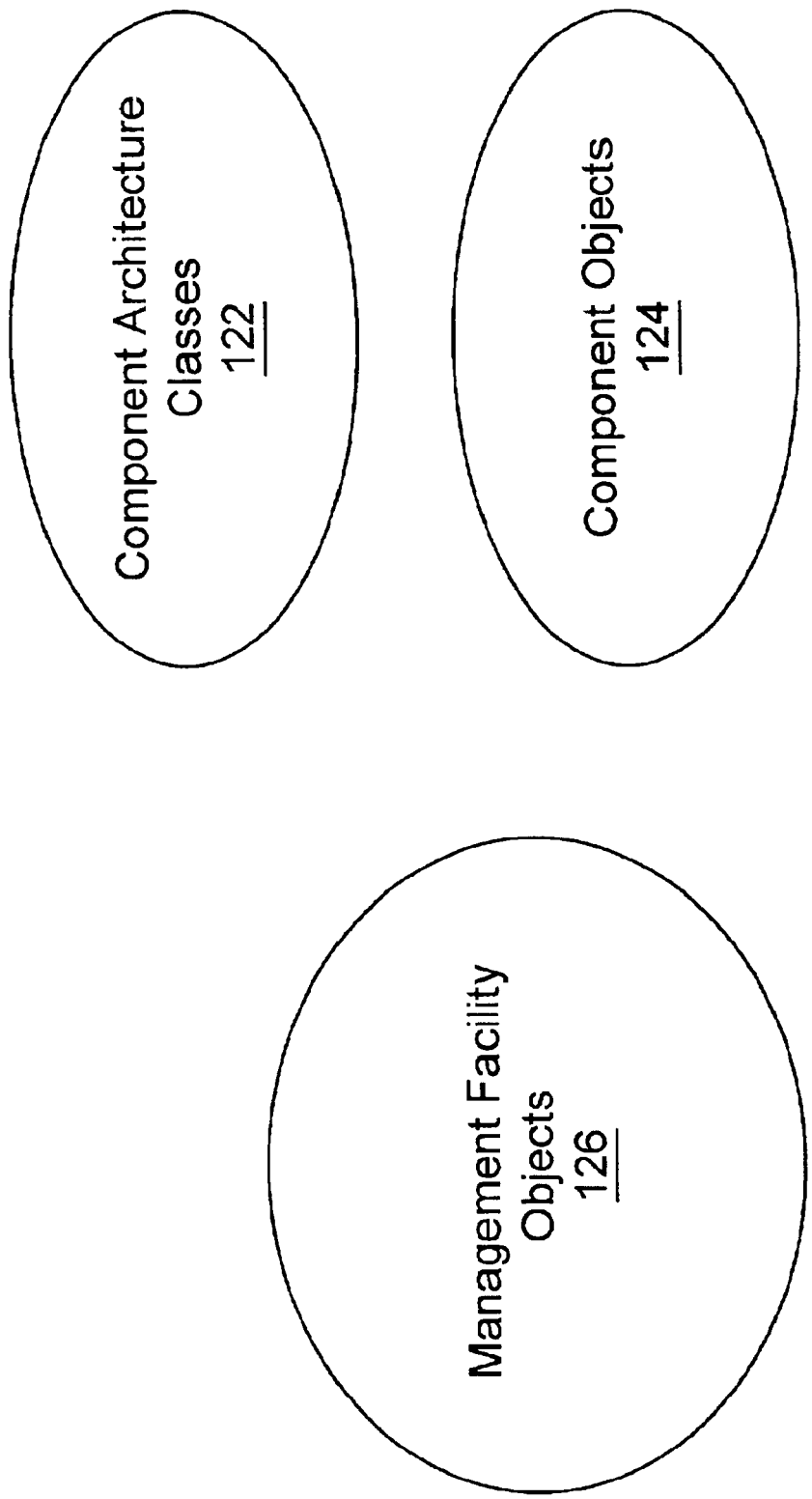
FIG. 5 illustrates the component architecture according to one embodiment of the invention.

FIG. 5—Component Architecture

FIG. 5 illustrates the component architecture according to one embodiment of the invention. The system comprises a flexible, distributed architecture composed of configurable components. The architecture enables the development, deployment, operation, and support of highly inter-operable enterprise optimization solutions. The architecture of the present invention provides flexibility and modularity in deployment, execution, management, and visualization of modeling and optimization solutions.

As shown, the component architecture may include a plurality of component architecture classes 122. These base classes 122 can be used to create or instantiate various component objects 124, which are instances of the base classes. Further, new classes and/or objects can be created from this set of base classes 122 and component objects 124. The component objects 124 can be combined or used to create higher level objects or applications.

The component architecture may include a plurality of various object management tools and facilities such as global naming, storage and retrieval, cataloging and location, project grouping, deployment, revision tracking and visualization management. The uniform object management facilities included in the system provide systematic management of project complexity.

Figure 6:
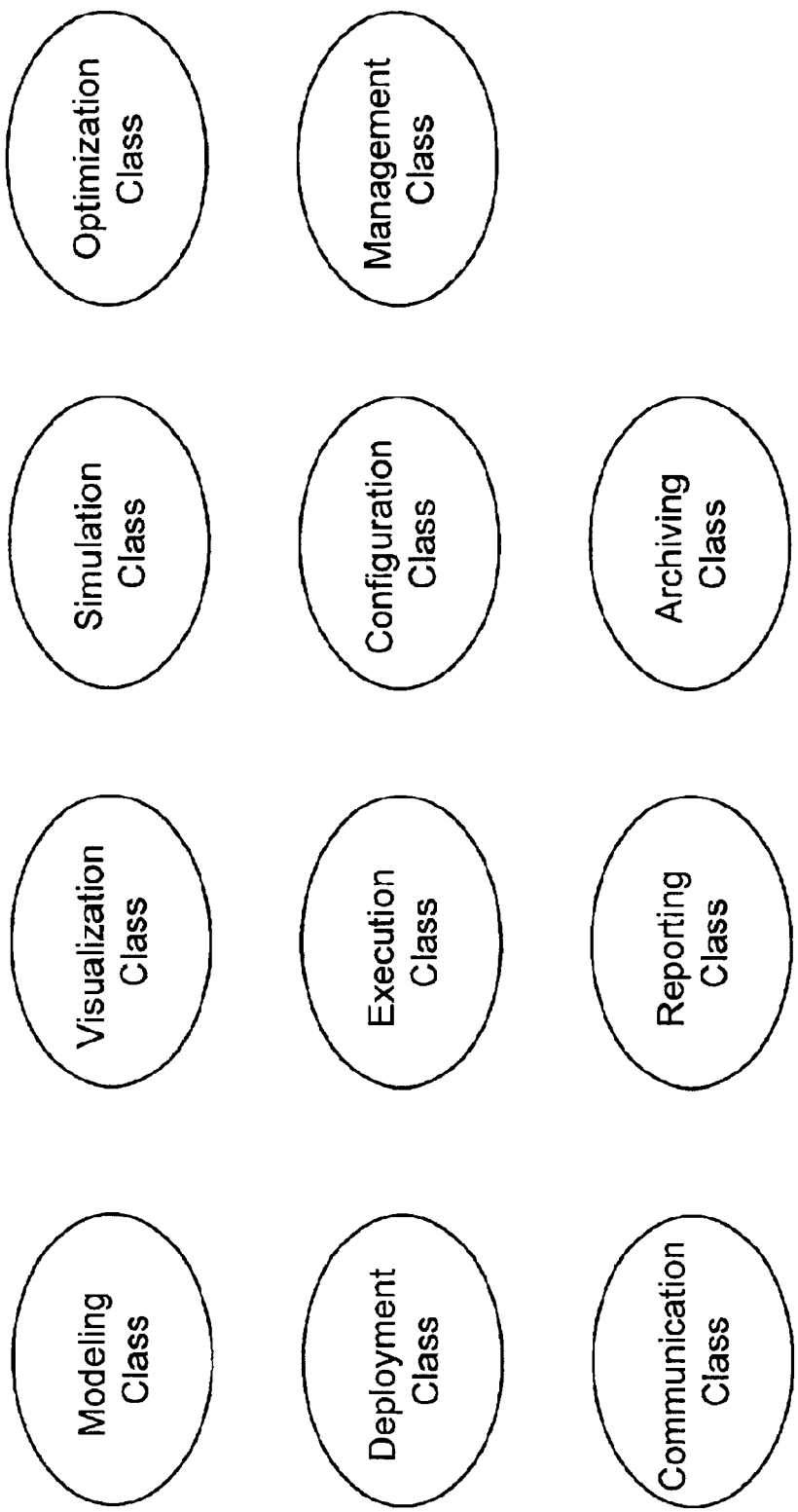
FIG. 6 illustrates representative examples of various of the component or object classes comprised in the architecture of the preferred embodiment.

FIG. 6—Exemplary Object Classes

FIG. 6 illustrates representative examples of various of the component or object classes comprised in the architecture of the preferred embodiment. As shown, the preferred embodiment may include different components or primitive object classes for modeling, visualization, simulation, optimization (solver), deployment, execution, configuration, management, communication, reporting and archiving, among others. These components comprise a set of base classes from which various instances of these classes, or objects, may be generated. These instances may interact in an event based manner and may be combined to perform higher-level applications.

The visualization and configuration components include a framework which provides web enabled access, enterprise wide access, on demand attachment, and view customization. Using the visualization and configuration components, the user can perform a variety of functions such as viewing historical data, monitoring debugging traces, monitoring decision engine execution, accessing solver diagnostics, locating and managing the decision engine, reconfiguring the deployed decision engine, and monitoring alarms and events.

For more detail on the base classes comprised in the component architecture, please see the document titled "Business Requirements Document" enclosed herewith.

Figure 7:
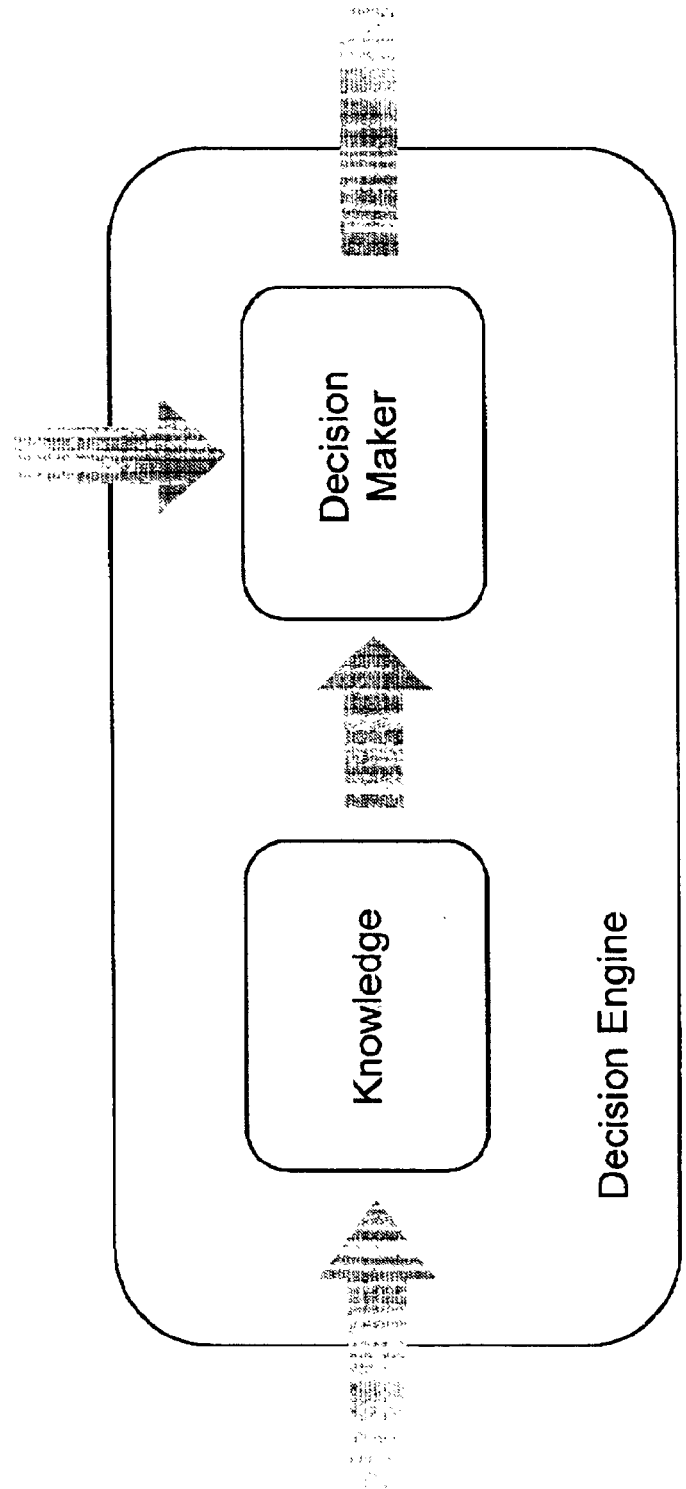
FIG. 7 illustrates an example of an encapsulated decision engine.

FIG. 7—Encapsulated Decision Engine

Figure 8:
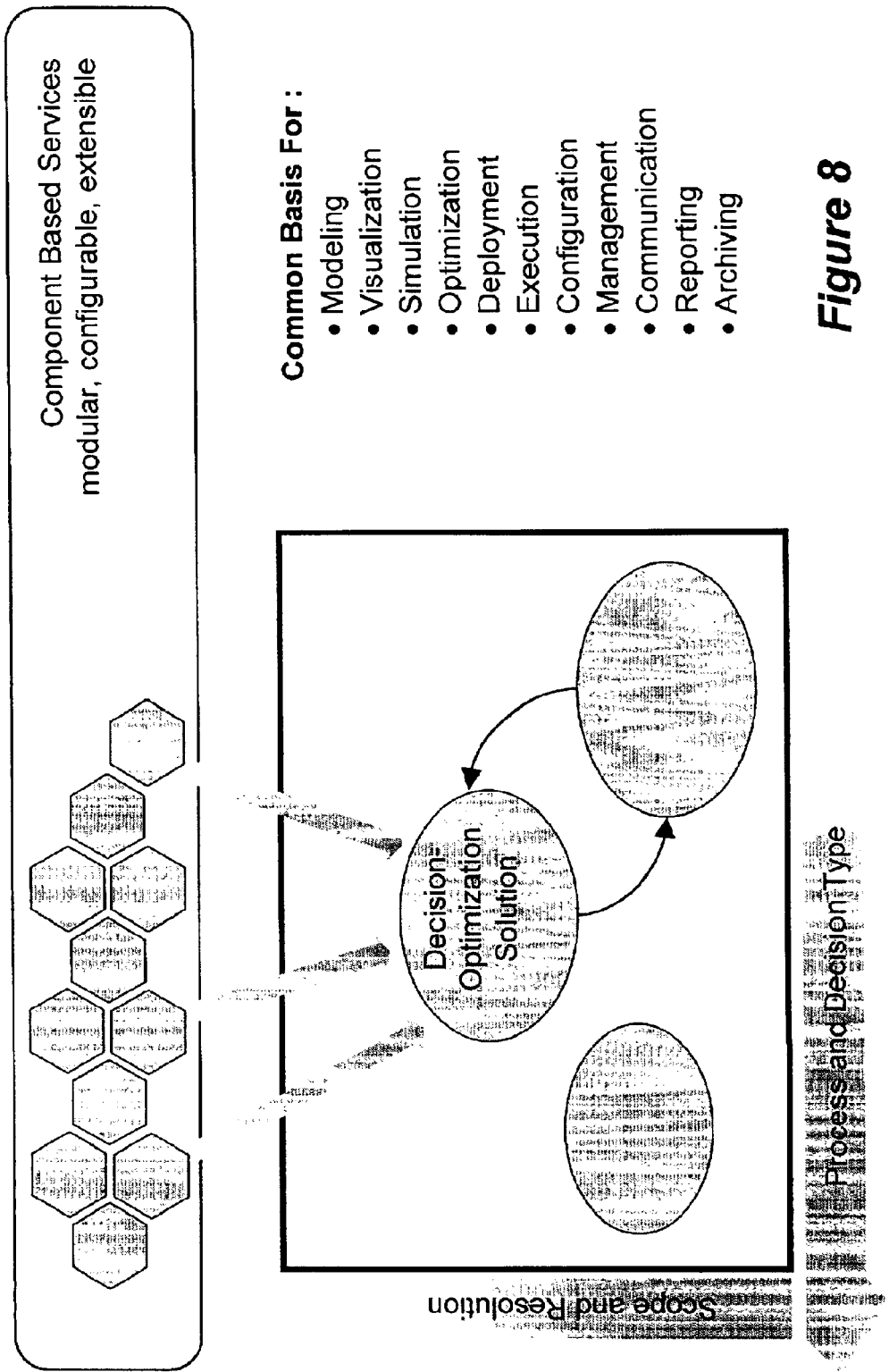
FIG. 8 illustrates the Decision Engine component used as a modular component or object in a higher level solution.

As shown in FIG. 7, the various objects can be used to encapsulate the Decision and Optimization Solution, i.e., the decision making process, as a "Decision Engine". The Decision Engine may thus be an encapsulation of the knowledge and the decision making logic into a modular, portable, configurable and extensible component. The Decision Engine may be an encapsulated component or object which has its own defined API. The Decision Engine may thus be a portable component that can be invoked in a variety of contexts, and can be reused in different applications. FIG. 8 illustrates the manner in which the Decision Engine component may be created from the various primitive objects, and also illustrates the manner in which the Decision Engine component may be used as a modular component or object in a higher level solution.

The component architecture of the preferred embodiment includes event triggered execution. In traditional prior art systems, execution is performed on a fixed periodic basis. As shown, the decision engine component and other component functionality may be invoked in various contexts and in response to various events. Execution of the decision engine may be triggered based on various events such as a synchronous clock, an external condition, a procedural step, or automation code, among others. This flexibility allows the creation of powerful custom solutions.

The component architecture of the preferred embodiment also provides flexible deployment, wherein the modular decision engine component and other solutions created in the architecture of the present invention may be deployed in a variety of execution contexts. Examples of where the decision engine component may be employed include a web client/web server environment, a workstation application and an application server.

Figure 9:
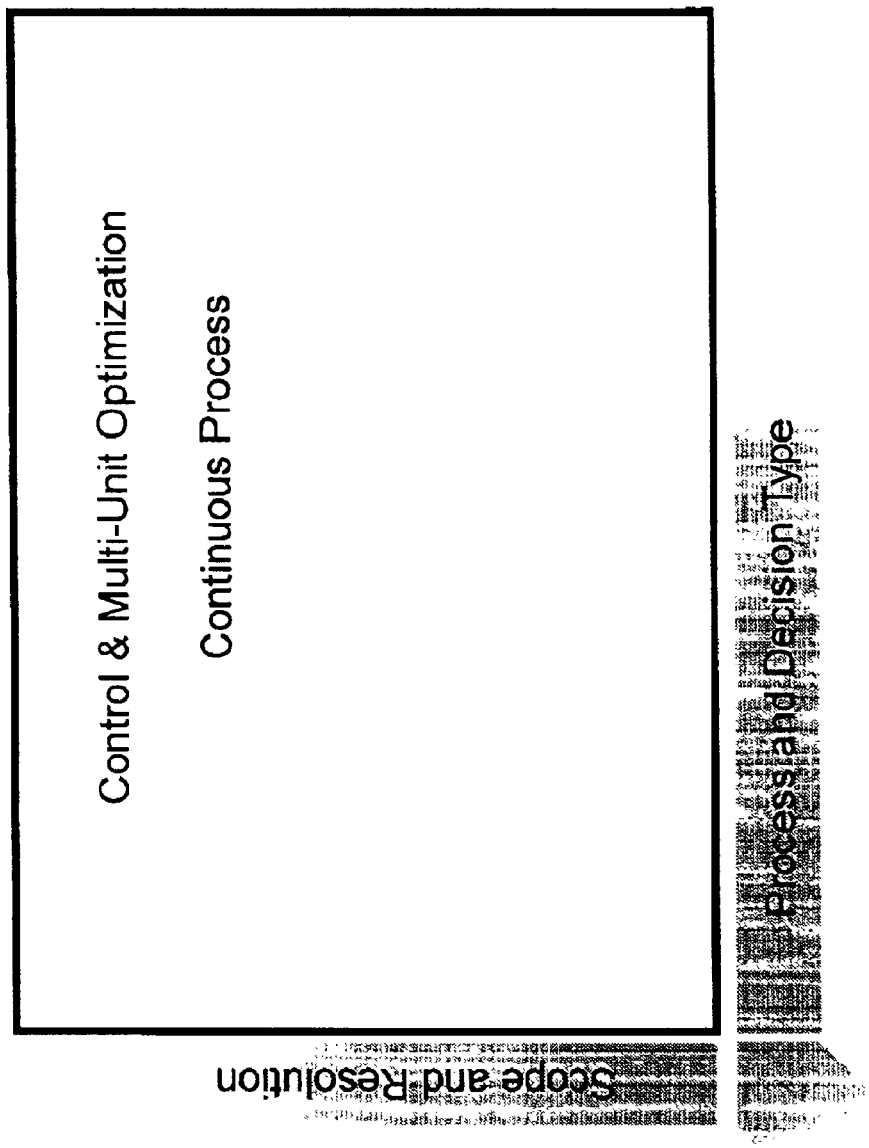
FIG. 9 illustrates the graph of FIG. 3, but having the approach used according to one embodiment of the invention.

FIG. 9—Unified Approach

Figure 3:
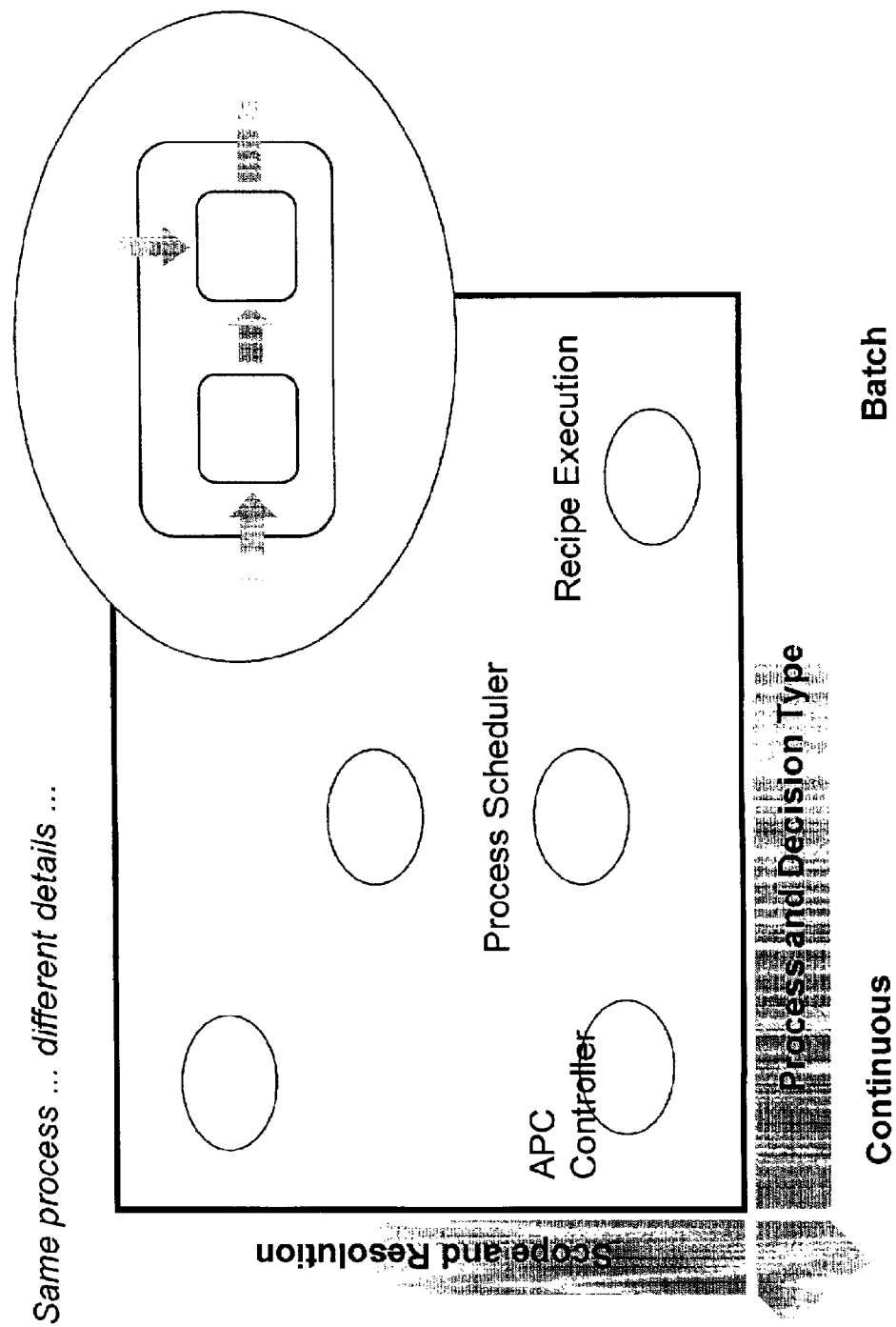
FIG. 3 illustrates the traditional prior art approach to scheduling/optimization problems.

FIG. 9 illustrates the graph of FIG. 3, but having the approach used according to one embodiment of the invention. As noted in the background section, in this graph the X axis represents the process and decision type, where the values along the X axis vary from continuous processes at the origin, to batch processes as X increases and then finally to discrete processes. The Y axis represents the scope and resolution of the decisions being made. At the origin, the scope and resolution of the decisions are local involving very simple decisions, and as Y increases, decisions become more complex until at the highest point of the Y axis the system involves planning the strategy of a whole enterprise.

As shown, the component architecture of the present invention allows different decision making components to be applied and spread across this 2-dimensional space. This leverages the commonality that is found across these two axes, rather than focusing on the differences between them. The present invention thus provides the framework for various different solutions.

Improved Modeling/Optimization Methods

Various embodiments of the present invention include techniques for optimizing enterprise operations, such as manufacturing operations, e-commerce operations, business-to-business e-commerce systems, etc. These techniques are described below with respect to manufacturing processes, but may be readily applied to any of various enterprise systems, such as those mentioned above, among others.

Distributed Event-driven Component Architecture

The underlying architecture of the present system is structured to support the modularity, flexibility, and scalability needs of nimble enterprises. Components are designed with plug-and-play modularity to allow substitution with better technologies, as they become available. Business functions within the architecture may be replaced with other functions on a component-by-component basis with minimal, if any, negative impact to other business functions.

Traditional software development has integrated some of these capabilities into a single monolithic system; however, re-use of modules becomes impractical. Even worse, some software products consist of isolated islands of functionality with very limited interoperability. In the preferred embodiment of the present invention, these functions are components of the architecture but are not dependently integrated. New modules can be easily added that extend the core functionality without replacing the whole enterprise solution.

Components represent discrete, independent system functions that perform a single business function. The components are reusable and are combined to form modules in support of a specific business process; they can be combined, disassembled, recombined, reused, added, and replaced to support change. They standardize the functionality of each basic business function. Through the reuse of the components, redundancies are removed, and system processes are assembled in a consistent manner. A comprehensive series of components for business and specific industries is delivered. Each has a parameter configuration layer to facilitate incorporating client-specific processing requirements without requiring custom software.

The system and method of the present invention contains general tools leveraged by all components such as modeling tools, decision engines, rules-based explanations, and run-time engines. The present system also has flexibility in dealing with data sources, data transformations, currency conversions, and multi-platform processing.

Architectural support is provided for the bonding of reusable components. Rather than crafting an entire application each time a new process is needed, the present system facilitates the assembly of new business processes from existing business components.

Under this architecture, processing (preferably all processing) is initiated by an event. An event is the specific occurrence of a process, originating either internal or external to the system model. An event can be generated through human action or by an automated process. The occurrence of any given event will often become the trigger for initiation of other events. The solution to any business problem, then, becomes a series of interrelated events.

Within the system, an event is the result of a specific task such as successful/unsuccessful, true/false or a numeric task type assignment to select one of a series of options. Events typically have additional tasks to be performed based on the result. These associated tasks will also produce results and will be classified as events of their own. This consequence processing is what allows entire business processes to be built from individual events. Any number of events can be created within the system to allow for the processing of any necessary scenarios.

Figure 10:
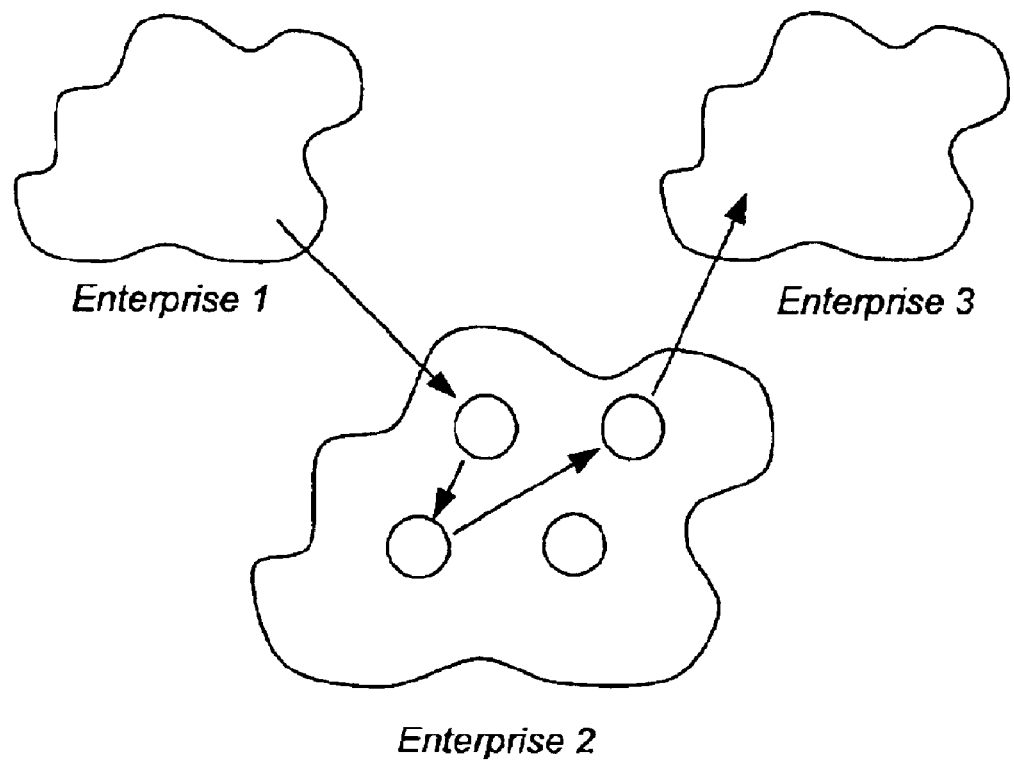
FIG. 10 illustrates the interactions of events between enterprises.

Business enterprises generally interact with other business enterprises, such as customers, suppliers, and distributors. As shown in FIG. 10, these interactions are represented in the present system as events in a manner consistent with internal events. Each event, whether internal or external, is tagged with appropriate identity information suitable for auditing, genealogical, or other purposes. Thus, events may span enterprises.

Synthesizing Batch and Continuous Processing Frameworks

In one embodiment, the present invention includes an improved system and method for modeling, optimization and control of batch and continuous processing frameworks.

Manufacturing processes have traditionally been broken down into two primary modes of operation: batch and continuous. A batch process is one in which a series of operations is conducted over a finite period of time on a discrete, identifiable, and traceable lot of material. A continuous process is one in which operations occur simultaneously on a stream of material.

Batch processes provide flexibility for producing multiple products in relatively small quantities. In many instances batch processes are necessary because they provide the environment required to achieve the physical and chemical conditions to perform a specific task. For example, fermentation requires a controlled condition for an extended period of time. Batch processes make this possible and are a more flexible solution when compared to continuous processes. Although the batch and continuous modes of operation are fundamentally different, the overall objective of each is essentially the same: to convert raw materials into desired products in the most economical way.

In addition to fundamental differences between batch and continuous manufacturing, the corresponding automation solutions have fundamentally distinct characteristics. Continuous automation solutions are characterized by feedback data-flow structures. Batch automation solutions are characterized by event-driven sequences of procedural instructions.

Any actual manufacturing process has elements of both continuous and batch processing applied at different levels. In managing a continuous process, it is necessary to perform such tasks as startup, shutdown, transitions, and grade changes. These tasks have a batch-like nature. Likewise, regulatory and advanced process control applied during a batch operation has a continuous nature. In addition, many processes themselves have both batch and continuous processing steps.

Given that a complete automation solution requires both continuous and batch methods, the present system includes a framework that seamlessly blends event-driven procedural logic and data-flow structures at all levels of the enterprise.

Hybrid Model Representations

Optimal decision making requires appropriately constructed models that accurately describe the behavior of the system. In general, there are two ways to describe the behavior of a system:

First-principles Model—A model whose internal mathematical representation is based on an understanding of the physical processes that occur within the system. These knowledge-based models are also referred to as fundamental models.

Empirical Model—A model that captures the input/output behavior of the system based on measured data without relying on knowledge of the physical processes that occur within the system.

There are certain advantages and disadvantages associated with each of these models.

First-principles models are usually more accurate and can extrapolate better. They also provide a physical understanding of the process, which is indispensable for design purposes. Empirical models are applicable as long as appropriate data is available. They are, however, limited to the quality and extent of that data. Empirical models are often faster and easier to construct and can typically operate at much faster processing speeds.

In numerous applications, first-principles and empirical models alone are not sufficient for proper description of the problem at hand. To compensate for the lack of information, often-conservative decisions are made to ensure fail-safe operation. Batch processes in particular are known to be prone to this problem (i.e. often first-principles knowledge of the process is not completely available, and the available data alone is not rich enough). In fact, the development of effective advanced control algorithms would be enhanced by the ability to leverage the advantages of both model representations.

Empirical modeling has been used to control many sophisticated nonlinear processes. One embodiment of the present invention provides the following capabilities to meet the technological challenge that a systematic decision-making process presents:

Composition—Provide encapsulation and composition of different model types. For example, if there is an empirical model for one unit, and a first-principles model for another unit, enable coherent inclusion of these models into a combined model to allow for unified optimization.

Training—Use of first-principles information (including any expert knowledge) to complement the available data during training of an empirical model. The resulting empirical model reconciles the information available from process data and expert knowledge into a computationally manageable framework. Thus, real-time decision-making in a batch operation scenario becomes numerically feasible.

Parameter Identification—Use of nonlinear, empirical modeling techniques to identify parameters of first-principles models based on measured data. This facility provides parametric identification for representations other than pure data-fitting forms. As shown in FIG. 11, the system and method of this embodiment includes a unified modeling framework which unifies the various types of models such as first principle models, also referred to as fundamental models, empirical models and procedural/recipe models. In many processes being modeled, the process does not completely conform to a single model type. Rather, the process may have elements of several model types. Thus this embodiment of the present invention allows different model types to be used together for to more correctly represent these types of hybrid processes. This provides more flexible modeling services than have existed in the prior art.

Figure 12:
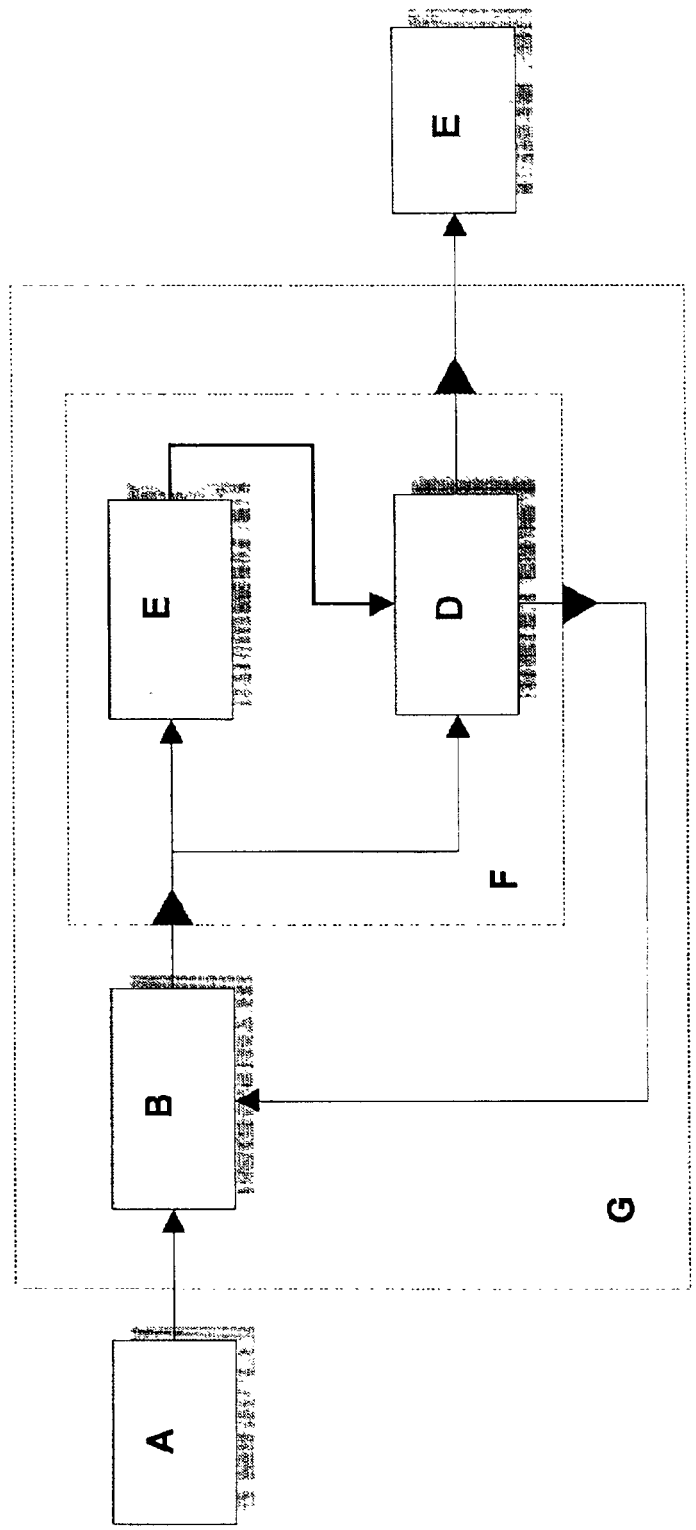
FIG. 12 illustrates an example of model aggregation according to one embodiment of the invention.

FIG. 12 illustrates an example of model aggregation according to one embodiment of the invention. As shown, FIG. 12 illustrates that heterogeneous combinations of model components may be aggregated together. This encapsulated aggregate model, which may comprise models of different types, may then be treated itself as a model. The encapsulated aggregate model is a modular and reusable component which can be used with various other objects, as desired.

Thus, one embodiment of the present invention provides a unified modeling framework which allows a user to aggregate different model representations for the different pieces of the system. Thus, the models chosen may be a mixture of a neural network and various other empirical or fundamental modeling types.

Flexible Decision-making Hierarchy

In another embodiment, the present invention includes an improved system and method for flexible configuration of the decision-making hierarchy.

The traditional operation of an enterprise is composed of a hierarchy of decision-making activities that include such generic tasks as planning, scheduling, optimization, and control. The hierarchical separation of these tasks corresponds closely with human roles and responsibilities within the manufacturing organization. High-level decision blocks encompass long-term goals of the enterprise and address a broad scope of operations. Low-level decision blocks cover shorter time frames and narrower scope, such as the actual execution of actions on the plant floor.

The separation of these decision-making elements serves two purposes. First, it provides a divide-and-conquer strategy rendering the decision-making process tractable. Second, it isolates tasks that have different processing needs and different problem representations.

FIG. 13 illustrates two examples of such decision-making hierarchies. The first is typical of batch process automation; the second is typical of advanced process control and optimization for a continuous process. Clearly, the division of tasks is not unique, even within the manufacturing execution layer. Furthermore, given that the problem characteristics vary considerably within a level, it is apparent that no single solution can apply to all operations.

Rather than force-fitting a single solution to all organizations, a more powerful approach is to provide a framework that allows the flexible combination of modular decision-making components. This approach allows the automation solution to match the requirements of the business more effectively. This framework also facilitates rapid, efficient restructuring of the components as the business needs change.

A modular decision-making hierarchy can be described by first abstracting the common elements within various hierarchies and then blurring, or even eliminating, the distinction between traditional layers. This is illustrated in FIG. 14.

Figure 14:
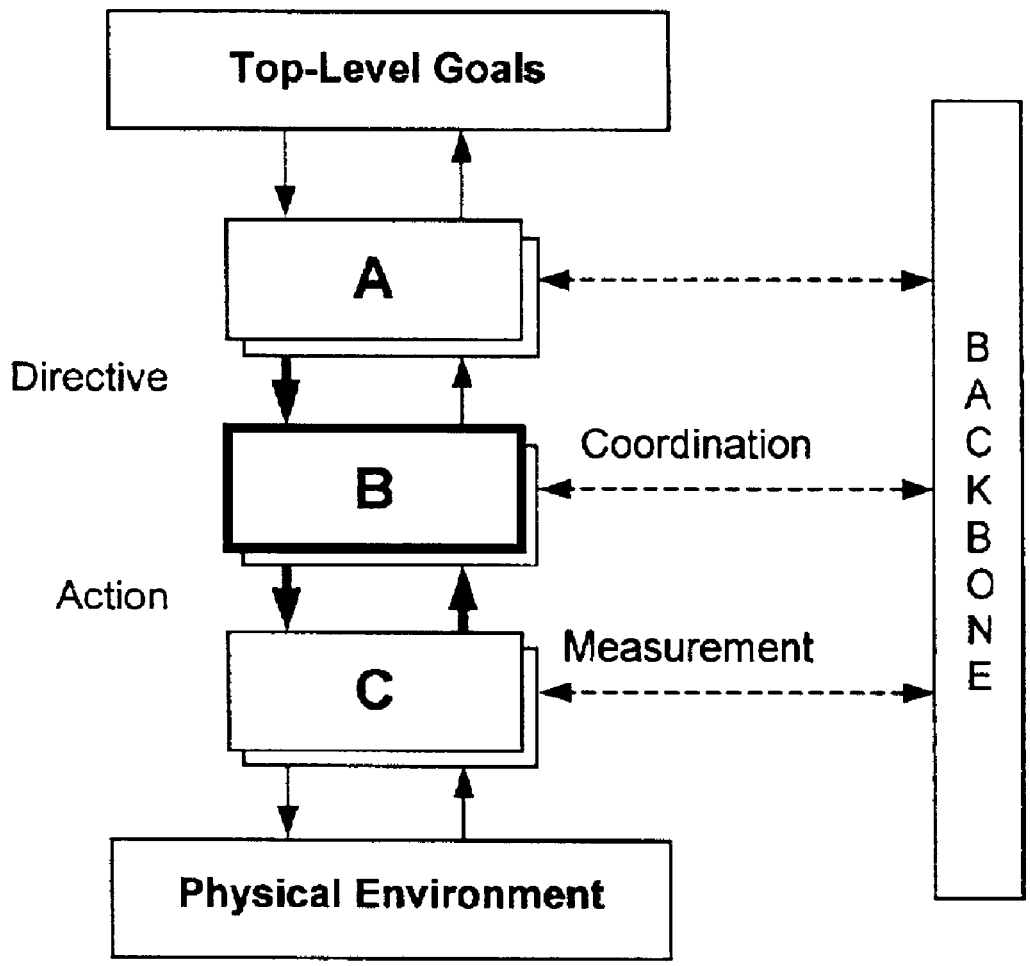
FIG. 14 illustrates a flexible decision-making hierarchy according to one embodiment of the invention.

As shown in FIG. 14, each level of the abstracted decision-making hierarchy exchanges information with the levels above and below. From the perspective of level B, directives are received from higher level unit A such as valve settings, targets, product specifications, or schedules. The characteristics of the information depend on the type of decisions to be made at that level. Actions determined at level B are sent to level C. For example, a tank-level controller receives a target fluid level from an optimizer every ten minutes and relays a sequence of valve settings to the control hardware every five seconds in order to maintain the tank at that target level.

The corresponding upward flow of measurement information from C to B serves several purposes. First, it provides feedback about how C has responded to the supplied actions and can be supplied either periodically or as exception events. Second, level C conveys constraints to level B, such as valve position limits. Third, level C provides a simplified model of its behavior in order to improve the decision-making process of B. This third piece of information is critical for tightly integrating the decision-making hierarchy while maintaining modularity of the individual levels.

The coordination backbone link is necessary to integrate tasks that operate under different execution metaphors. For example, if level A operates in a daily transactional environment and level B operates in real time, the coordination backbone synchronizes their execution. Moreover, the backbone will provide necessary data-translation services.

Given this abstraction as a basis, various decision-making components can be developed that will plug-and-play within an overall framework. An important requirement of this structure is to allow blurring between traditionally distinct levels such as scheduling and control. Appropriately-designed information exchange between components will allow one level to incorporate the dynamic behavior of the lower levels within its decision-making process. U.S. Pat. No. 5,933,345 describes a system which demonstrate how the seamless integration of steady-state optimization and model predictive control—traditionally distinct subsystems—results in a world-class solution. The framework expands the opportunities for developing and integrating such synthesized solutions. The real-world examples in Section 4 illustrate the value provided by such integrated solutions.

It is important to distinguish this architectural approach from two distinct extremes.

The first extreme would be to supply a stock planner, scheduler, optimizer, advanced process controller, and regulatory controller while leaving integration as an engineering exercise. This has been the traditional industry approach and significantly limits the capabilities of the delivered solution based on forced isolation of the decision-making components.

The other extreme would be to formulate the entire decision-making problem using a single representation and solving it as one unit. This would require that an organization force-fit its operation into a rigid, inflexible structure that did not accommodate dynamic business strategy. Furthermore, it is unlikely that the resulting problem formulation would be either solvable or practical to maintain.

Clearly, flexibility in choosing from a spectrum of decision-making strategies provides businesses the ability to make more appropriate use of information resulting in improved performance and profitability.

Figure 15:
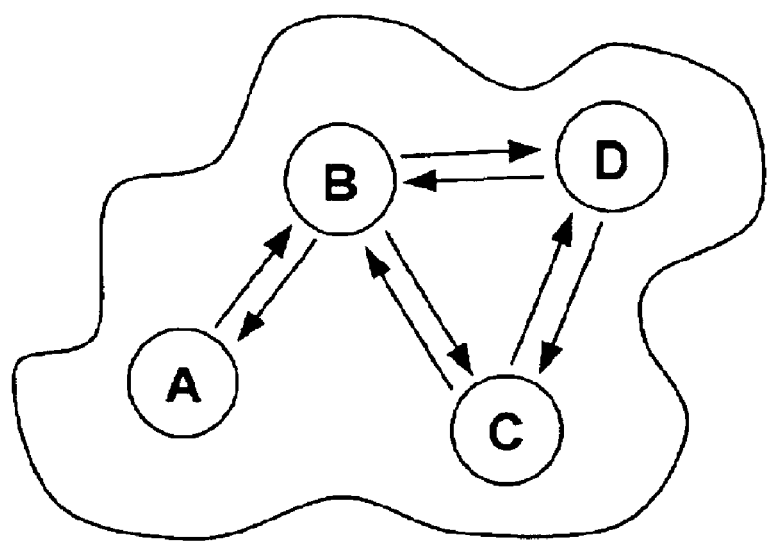
FIG. 15 illustrates a non-hierarchy decision-making framework.

Previous discussion assumed that the decision-making process, although flexible, is still structured as a linear hierarchy; this need not be the case. For example, multiple aspects of the organization might contain interdependent yet distinct decision-making processes. Integration of these systems might require further generalization of the decision-making structure to encompass networks of intercommunicating components as illustrated in FIG. 15.

More important, this network will not necessarily remain fixed over the life-time of the organization. Not only will the structure evolve as the goals of the business change, but the structure may also change dynamically in response to events internal or external to the organization. This flexible framework allows dynamic reconfiguration or selection among sets of configurations in response to unexpected events.

EXAMPLES

This section describes a series of examples that illustrate certain aspects of various embodiments of the present invention.

Pulp Mill Batch Digester

1. Current Approach

Figure 16:
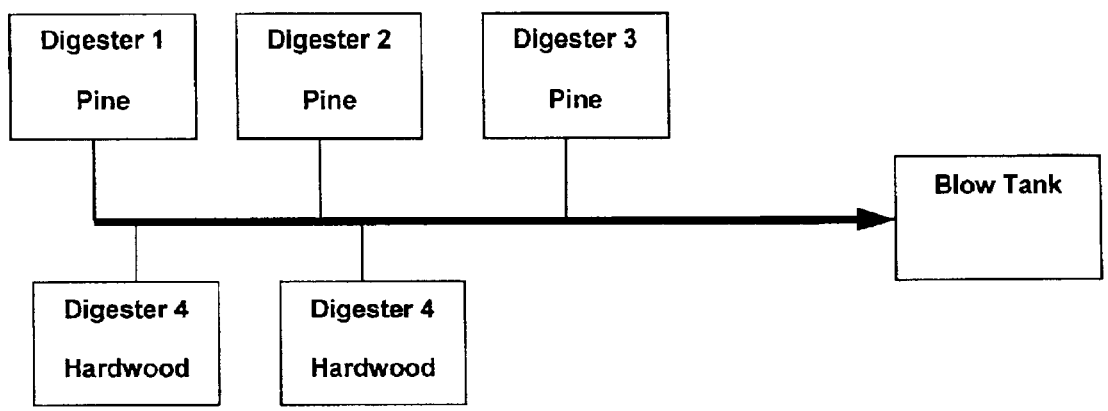
FIG. 16 is a block diagram of a digester line example.

In the paper making process, wood chips are broken down into pulp at the pulp mill. The customer (paper mill) sets the pulp production requirements in the number of tons per day of pulp, both hardwood and pine. At the pulp mill, wood chips are mixed with "liquor" and "cooked" in vessels called batch digesters. The digesters are heated with steam, pressurized, and the chips are "cooked." When the reaction is complete, the contents are released, or "blown," into a holding tank, and a new batch is started. Only one digester can be released at a time. The quality measurement of whether the pulp is finished cooking is called the Kappa number. FIG. 16 is a diagram of the process.

At the beginning of a batch, the operator can speed up the cooking time by adding more steam. Adding more steam will increase production at the cost of product consistency. The availability of steam is a constraint. Slowly adding steam gives a more consistent product and better upstream boiler operations. Once the cooking temperature is reached, the reaction cannot be slowed down or stopped. To maintain product quality, the digester is released, or blown, within a finite amount of time when the Kappa number is reached. If the operator has to hold a batch that is ready to blow, it will continue cooking and there will be a variation in the Kappa number. This variation causes problems in the paper machines downstream. The availability of steam, pulp production requirements, and product consistency are all constraints to this process. The Kappa measurement is taken after the process is complete or can be estimated with a model while the batch is cooking. This Kappa estimate helps the operator know when it is time to blow a digester and helps the operator estimate when a batch is done. Overcooking and under-cooking occur with upsets in steam and poor scheduling (e.g. two digesters need to blow at the same time). When upsets in steam delivery occur, the batch schedule needs to change dynamically to meet the quality and production requirements. Steam should not be demanded or cut too quickly, or else an upstream upset will occur at the boilers. Hardwood and pine have different cooking times. These dynamic requirements and constraints are more than the pulp mill operator can manage easily.

Unified Solution

Combining the ability to predict and control the Kappa number with a dynamic schedule and the ability to control a batch during the cooking phase provides the following:
more consistent product,
ability to handle steam upsets,
more stable upstream boiler operations,
better utilization of capital equipment.

Software that optimizes the batch digester schedule and operations has a tremendous impact on the company's profitability.

Unified Automation System for a Polyolefin Plant

Although operated continuously, polyolefin plants generally produce different grades of resin at different times. A polyethylene plant always produces polyethylene; however the resin used for making milk bottles is significantly different from that used to make garbage bags. The basic specification which distinguishes the grades, called Melt Index (MI), is related to the length of the polymer chain, and can be compared to viscosity. The plant is operated very differently to produce each grade. The act of changing the line to move between grades is commonly called a transition. Transitions commonly generate resin, which cannot be sold as either the starting or ending grade, and must be disposed of at a loss. The economics of all polyolefin plants are dependent upon how transitions are managed. On average, there is one transition a week at each line lasting from 4 to over 24 hours. Lost revenue per transition can be $5,000 to over $40,000. Considerable software, manpower, and monetary resources are employed to effectively manage resources. There is, however, much room for improvement.

Current Approach

In the current prior art approach, the first step is to schedule the different products in time to meet the customer demands for volume purchased and promised time-of-delivery. In addition to the customer demands, stock in inventory and transition costs are considered while determining the schedule. The transition model is a fixed matrix of average transition times between each possible combination of products. Some combinations are not allowed. For example, the transition matrix time for a 4 MI to 8 MI transition may be 4 hours while a transition from 0.8 MI to 20 MI may be 12 hours. The actual transition time under current conditions is not considered. Generally the inventory is increased to arbitrarily high levels so that the schedule becomes a wheel—products step up from low to high MI then back down, always moving between adjacent products. This scheme is obviously sub-optimal and does not allow for the best ability to promise delivery dates.

Once the schedule is set, the transition must be executed. Two systems are employed for this, the operations personnel and the control system. First the transition path must be selected. There are multiple ways to effect a transition. The line can run at full capacity and at full inventories while rapidly changing the reactant mix to the new product. This mechanism is usually fast but results in a large volume of transition, or off-grade, material. Alternatively, the line can cease production and empty all in-process inventory while on-grade with the current product, change the reactant mix while the reactor is empty and not producing, and then re-start the line and build the in-process inventory. This strategy has little off-grade production, but takes a long time with nothing produced. Although these options represent two extremes, there are infinite possibilities in between. An optimization engine does not decide the best path. The operation staff chooses based on experience and intuition.

Finally, the transition is executed based on the operator's goals by the control system. Expert systems and advanced control systems are occasionally used to facilitate the transition.

Unified Solution

A combined scheduling, optimal path selection engine, sequential and continuous control automation system is desired. The schedule and transition path optimization is preferably solved simultaneously using both the actual plant models and the currently relevant economics, including the cost of inventory. Then the transition path may be executed consistently according to plan. A combined sequential and continuous control system with continuous optimization is used for this step. The schedule and path selection can execute in real-time, and the results can be automatically downloaded to the real-time sequential and continuous optimization engine. With such a system, inventory levels can be reduced while simultaneously breaking "product wheel"-type scheduling to become more responsive to customer demands. Because the entire system executes rapidly, optional delivery times and prices can be quoted based on an accurate calculation of operating costs. Finally, because the entire system is fully automated, these quotes could be delivered via e-business vehicles.

Figure 17:
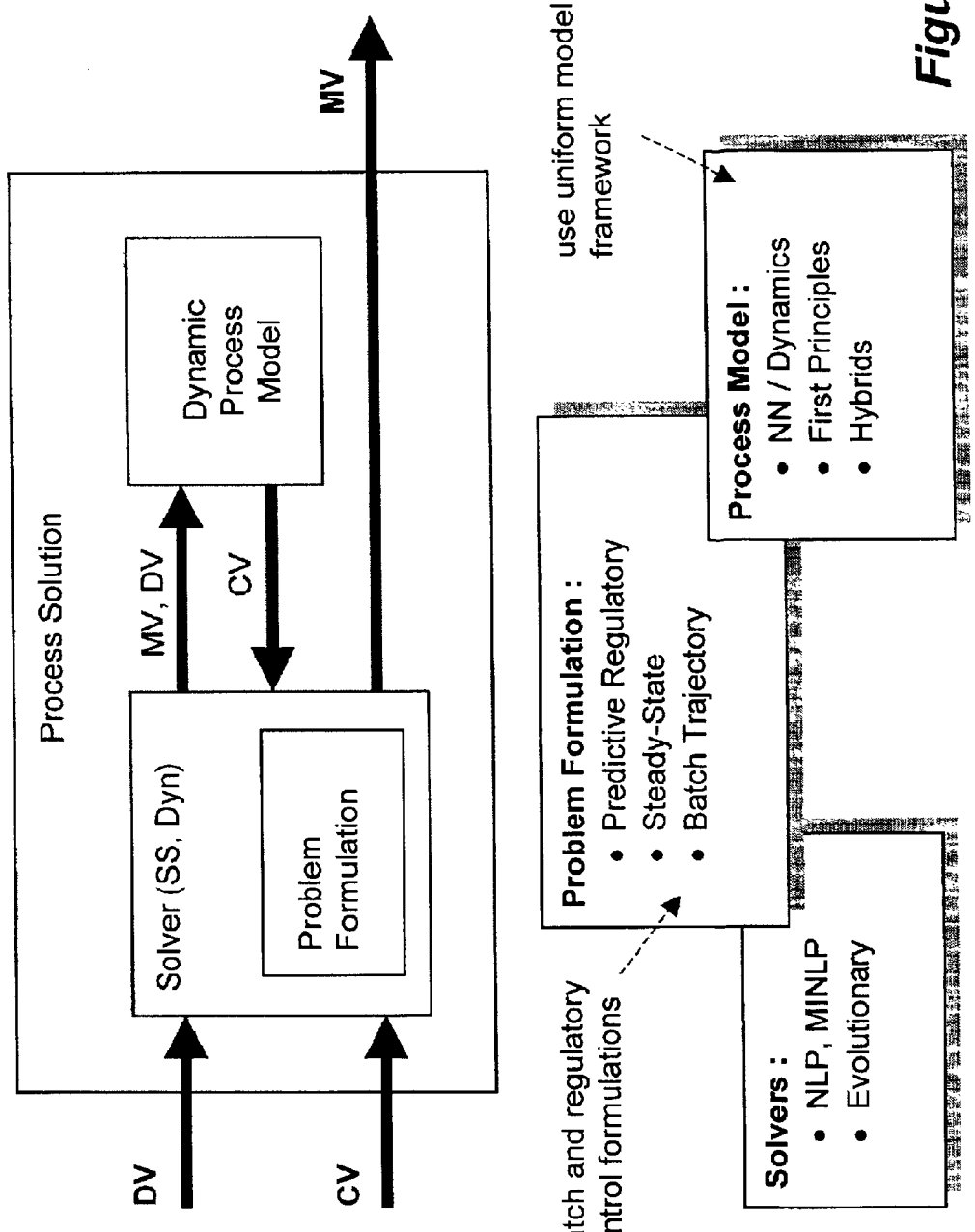
FIG. 17 illustrates a problem formulation for an optimization solution which may be created using the component architecture of the preferred embodiment.

FIG. 17—Problem Formulation for an Optimization Solution

FIG. 17 illustrates a problem formulation for an optimization solution which may be created using the component architecture of the preferred embodiment. As shown, an optimization solution may be created including a solver, a problem formulation, and a dynamic process model. The dynamic process model is an internal model of the process which enables prediction of how the process will respond over a period of time. Given a particular formulation of the problem, various solvers (or optimizers) may be applied in order to optimize how the process will behave over a horizon. This may be used to determine what control actions should be sent to the process to achieve a desired result.

As shown, each of the solver, problem formulation, and dynamic process model may comprise different modular plug and play components which may be created using the component architecture described above and which may be readily used or inserted to provide different solutions.

As shown, the dynamic process model comprises a modular component or object which may be any of various types, such as a first principles or fundamental model, a linear model, or a nonlinear model such as a neural net model. As noted above, the dynamic process model component may also be comprised of a hybrid model using the uniform modeling framework described above. Thus, the dynamic process model may be a component or object which represents two or more different model types, e.g., a first principles model and an analytic model which are combined together to create a single model object or component.

The solver may also be a modular component or object, and as with the process model object, different solver objects or components may be inserted into the solution as desired. As shown, the solver object or component may comprise a nonlinear programming solver, a mixed integer nonlinear programming solver or an evolutionary solver, among others. The solver object may also be referred to as an optimization object.

The problem formulation may also be a modular plug and play component or object which may be inserted into various different solutions. As shown, the problem formulation may take various forms, such as predictive regulatory, steady state, and batch trajectory. The problem formulation may also have both batch and regulatory control formulations.

Thus, the user may utilize different solver, problem formulation, and dynamic process model objects or components in a modular and reconfigurable plug and play manner to create different solutions. This allows a much more flexible and powerful mechanism for creating optimization solutions than that existing in the prior art.

Figure 18:
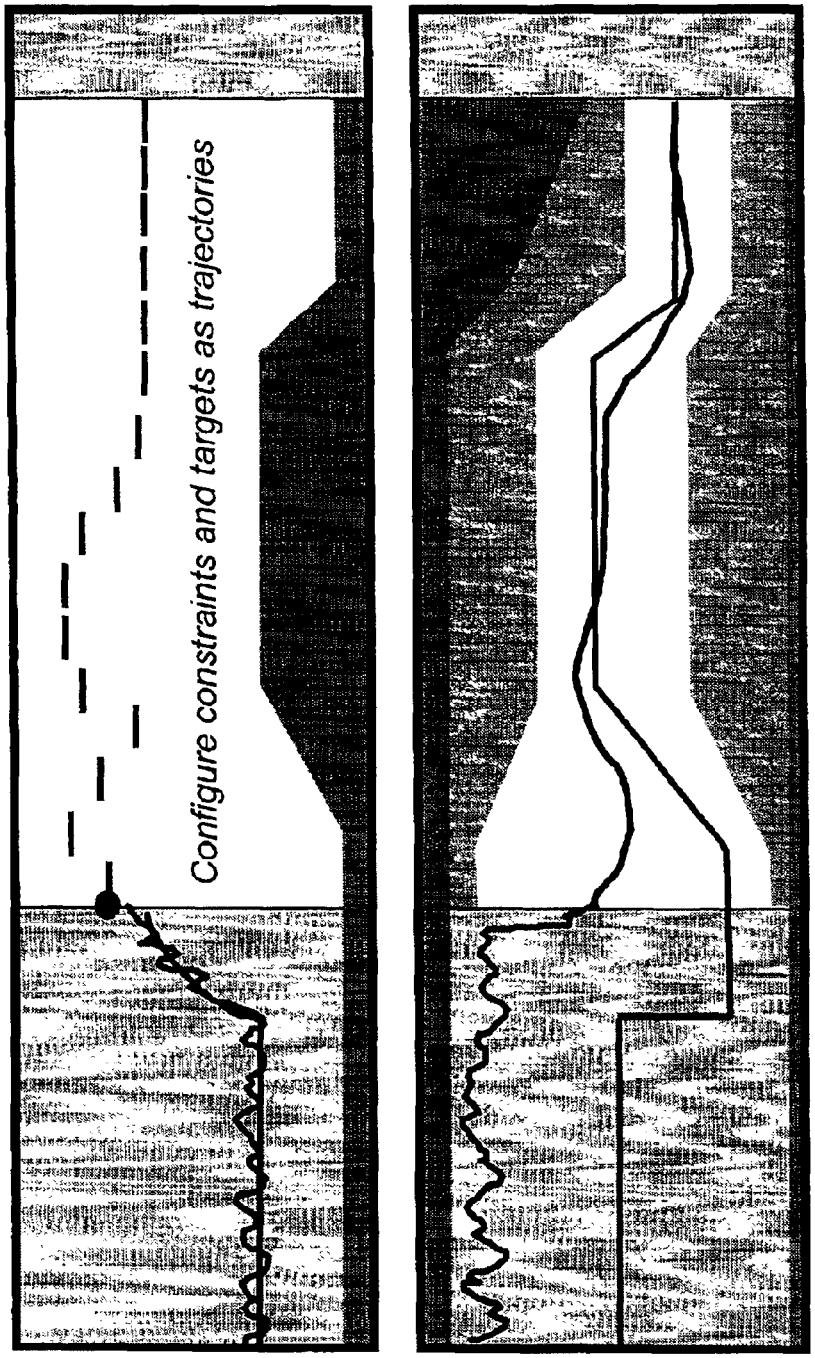
FIG. 18 illustrates flexible dynamic optimization which may be performed according to one embodiment of the invention.

FIG. 18—Flexible Dynamic Optimization

FIG. 18 illustrates flexible dynamic optimization which may be performed according to one embodiment of the invention. The system allows flexible dynamic optimization for different horizons. As is well known, a shrinking horizon refers to the notion in batch processes where the horizon time period in which the results of actions may be seen ends at a certain point in time, e.g., when the batch has completed. In contrast, a receding horizon may occur in a continuous process and presumes that the results of actions may be reflected over a lengthy or even infinite time period. As shown in FIG. 18 the graph illustrates two examples of a prediction horizon into the future. The vertical line contained in the graph illustrates where the process currently is in time. The portion to the left of the vertical line illustrates what the process has done in the past. The lines to the right of the vertical line in FIG. 18 represent a possible control action which may be provided to the process and the predictions of how the process will react in response to this control action. The graphs thus provide a visual metaphor presenting how the optimization solution is performing over time.

Prior art systems typically only allowed a predicted fixed set point to be set, wherein control actions may be provided to attempt to reach this fixed set point. However, according to one embodiment of the invention, the user is able to provide a continuous or discrete line indicating a desired result by configuring constraints and targets as trajectories instead of a single set point. Thus, the user can indicate that the temperature should follow a certain trajectory into the future and the user may then be able to optimize the profile of the temperature on a respective batch. Thus, as shown, the flexible dynamic optimization allows dynamic predictive control over both a shrinking horizon for batch phase trajectory control and a receding horizon for set point regulation.

Figure 19:
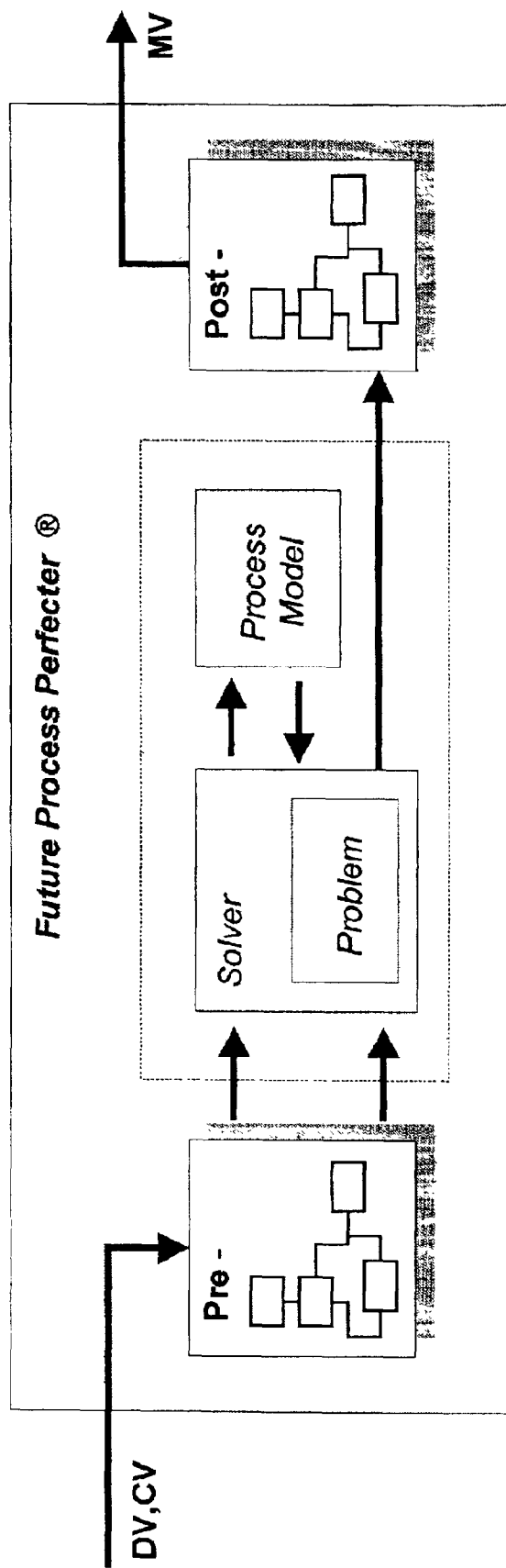
FIG. 19 illustrates embedded data processing within an optimization solution.

FIG. 19—Embedded Data Processing

FIG. 19 illustrates embedded data processing within an optimization solution. As shown, FIG. 19 illustrates that pre and post processing functions may themselves be encapsulated as respective components or objects. These components may be combined with other objects, e.g., a decision engine which may include one or more of a solver, problem formulation and process model, to create a more complete solution. Thus, a pre-processing object may be created, wherein the pre-processing object may comprise a configurable, modular and plug and play component which may be combined in various manners with the various different decision engines. In a similar manner, a post processing function may be encapsulated as an object or component which may also be combined with different combinations of decision engines. This allows a more modular and configurable mechanism for developing complete modeling, optimization and control solutions.

Figure 20:
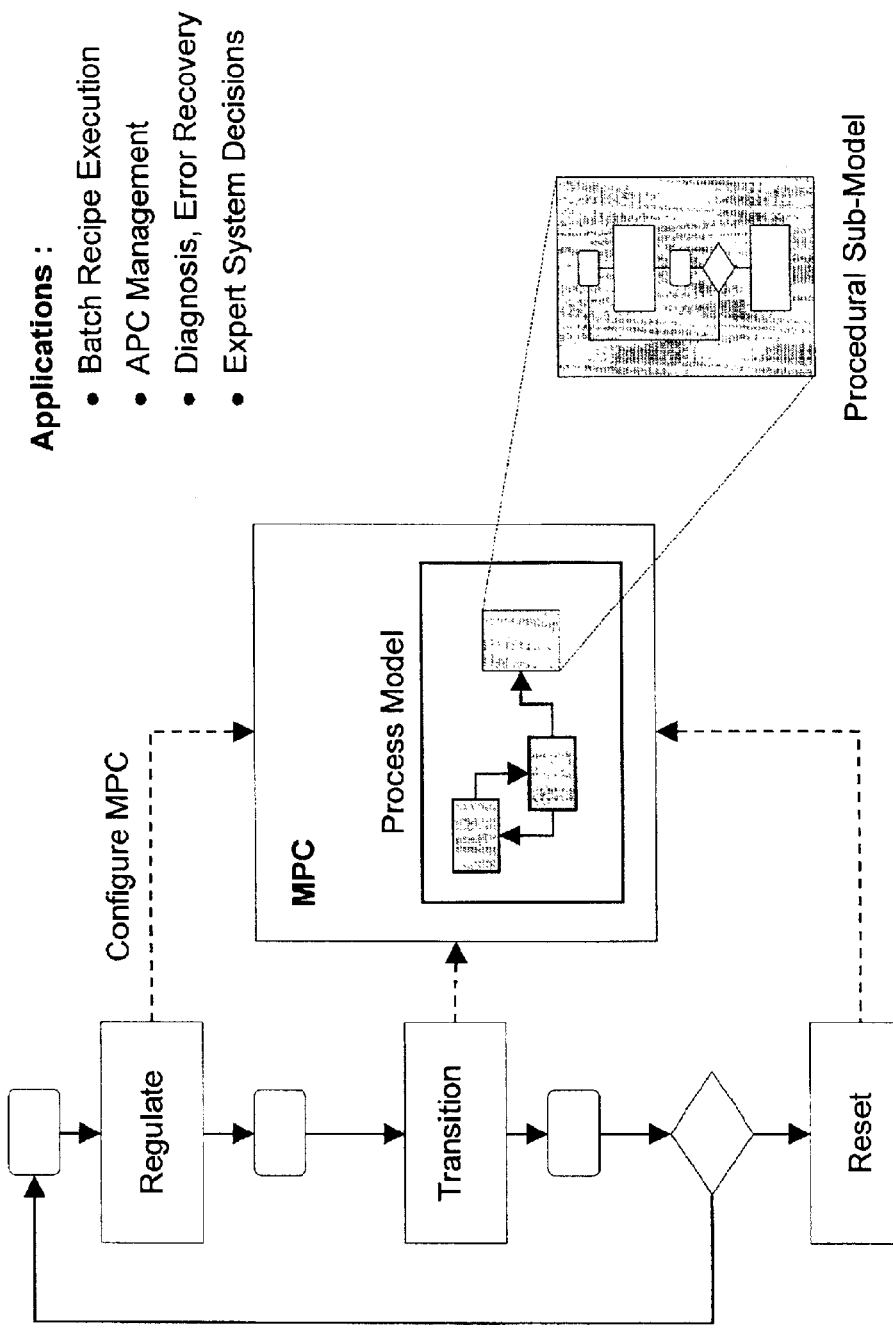
FIG. 20 illustrates the manner in which procedures may be treated as models in one embodiment of the invention.

FIG. 20—Procedures as Models

FIG. 20 illustrates the manner in which procedures may be treated as models in one embodiment of the invention. As shown, a flowchart or procedure may itself be treated as a model component. This procedural model component may itself be treated as a "procedural sub-model", wherein the sub-model may be combined with other model types to create a hybrid modular model component. As shown, procedures may be treated as models in various applications such as batch recipe execution, APC management, diagnosis and error recovery, and expert system decisions.

Figure 21:
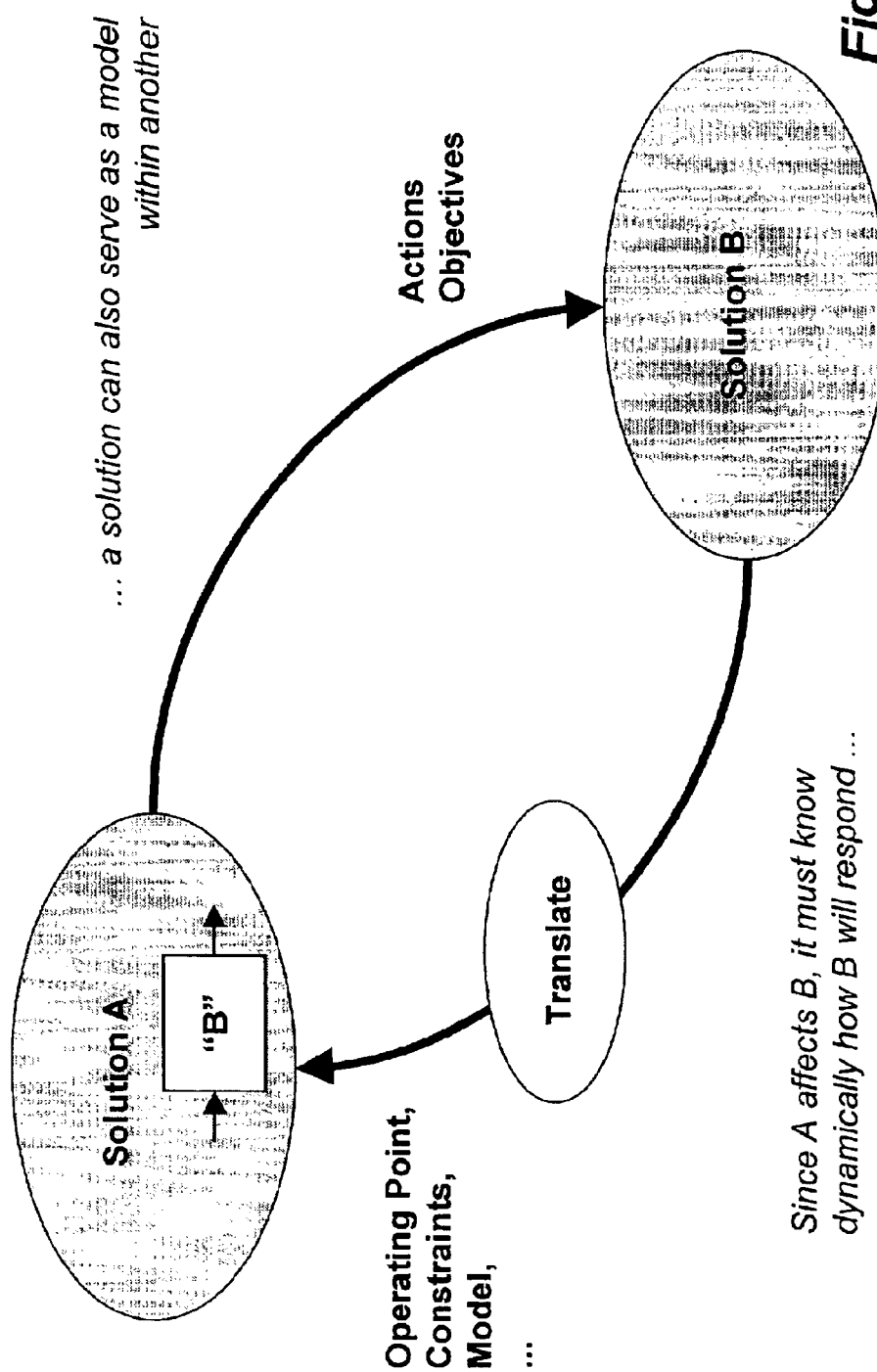
FIG. 21 illustrates the manner in which solutions may interact to provide an integrated decision-optimization network.

FIG. 21—Solutions Interact within Framework

FIG. 21 illustrates the manner in which solutions may interact to provide an integrated decision-optimization network. As shown, solution A may comprise a model as well as other components, e.g., a solver, constraints etc. which provides actions and objectives to control a second solution B. The second solution B may itself have a model and other components which may further control another solution or the process or enterprise being modeled or controlled. As shown, since solution A affects the operation of solution B, it would be desirable for solution A to dynamically understand or have knowledge of how solution B will respond to the actions provided by solution A. Therefore, as shown, in one embodiment of the invention a model of a solution can also be contained within another solution. Thus, a model of solution B may itself be comprised in solution A, so that solution A may use the model of solution B in determining the actions to provide to solution B. As shown, solution B may also provide translated results including operating point constraints and the model of solution B to solution A for this purpose. This thus provides an integrated decision-optimization network which provides more intelligent solutions than available in the prior art.

Separable Models/User Interface Components

Another important aspect of the architecture of one embodiment is that an application or solution may have a separable modular user interface which is separate from the decision engine controller or model. Thus, the deployable component, e.g., the decision engine is separate from the user interface component. Thus, different user interface components can be attached to the deployable component or solution in a modular fashion. Thus, the user may select among various different interfaces and change various different interfaces in a modular fashion as desired. Therefore, users can select different types of user interfaces for a single deployable component, such as a textual description, a graphical description, and use with buttons etc.

Figure 22:
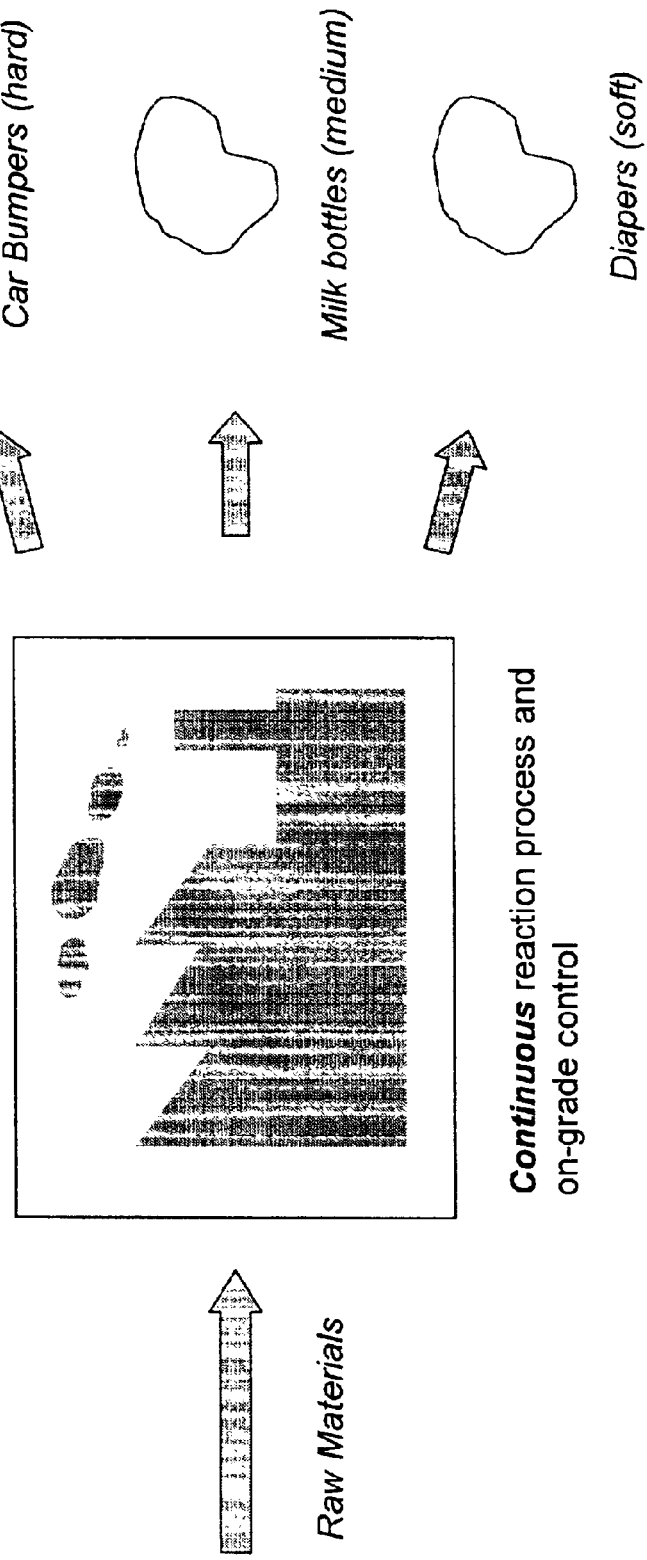
FIG. 22 illustrates a basic example of a process being controlled.

FIG. 22—Process Control Example

FIG. 22 illustrates a basic example of a process being controlled. More specifically, FIG. 22 illustrates a polymer production example wherein a reaction line produces various plastic grades to inventory based on scheduled needs. As shown, raw materials are applied to a process. The process may be either continuous or batch or may have aspects of both continuous and batch. For example, the process may have a continuous reaction process and on-grade control, as well as batch characteristics of lot handling and configuration automation. As shown, the process may utilize the raw materials to produce various plastic grades such as car bumpers (hard), milk bottles (medium), and diapers (soft).

In prior art systems, production scheduling and production control have traditionally been isolated layers. Production scheduling involves meeting demand, meeting delivery dates, and managing inventory. Production control involves maintaining product quality, maintaining product consistency, operating efficiently, managing production transitions, and managing unexpected disturbances. Where production scheduling and production control are isolated layers, these layers are unable to properly communicate with each other to produce an optimal enterprise solution.

Continuing with the example, the process line makes different grades of plastic at different times. The plastic component is produced and sent out to inventory and stored in different bins. When the customer makes an order, the business offer causes the triggering of some of this inventory to be shipped out to the customer. In order to avoid having the inventory be empty when a customer makes an order, often times the prior art (isolated) scheduling component would over fill the inventory in order to ensure that client demands can be met. Thus, the scheduling component would typically be very conservative about managing the inventory. The traditional disjoint method of solving this problem with separate scheduling and control layers provides an inadequate method of both scheduling and control, since each component cannot communicate with each other to provide necessary information needed by each for a more intelligent solution.

Figure 23:
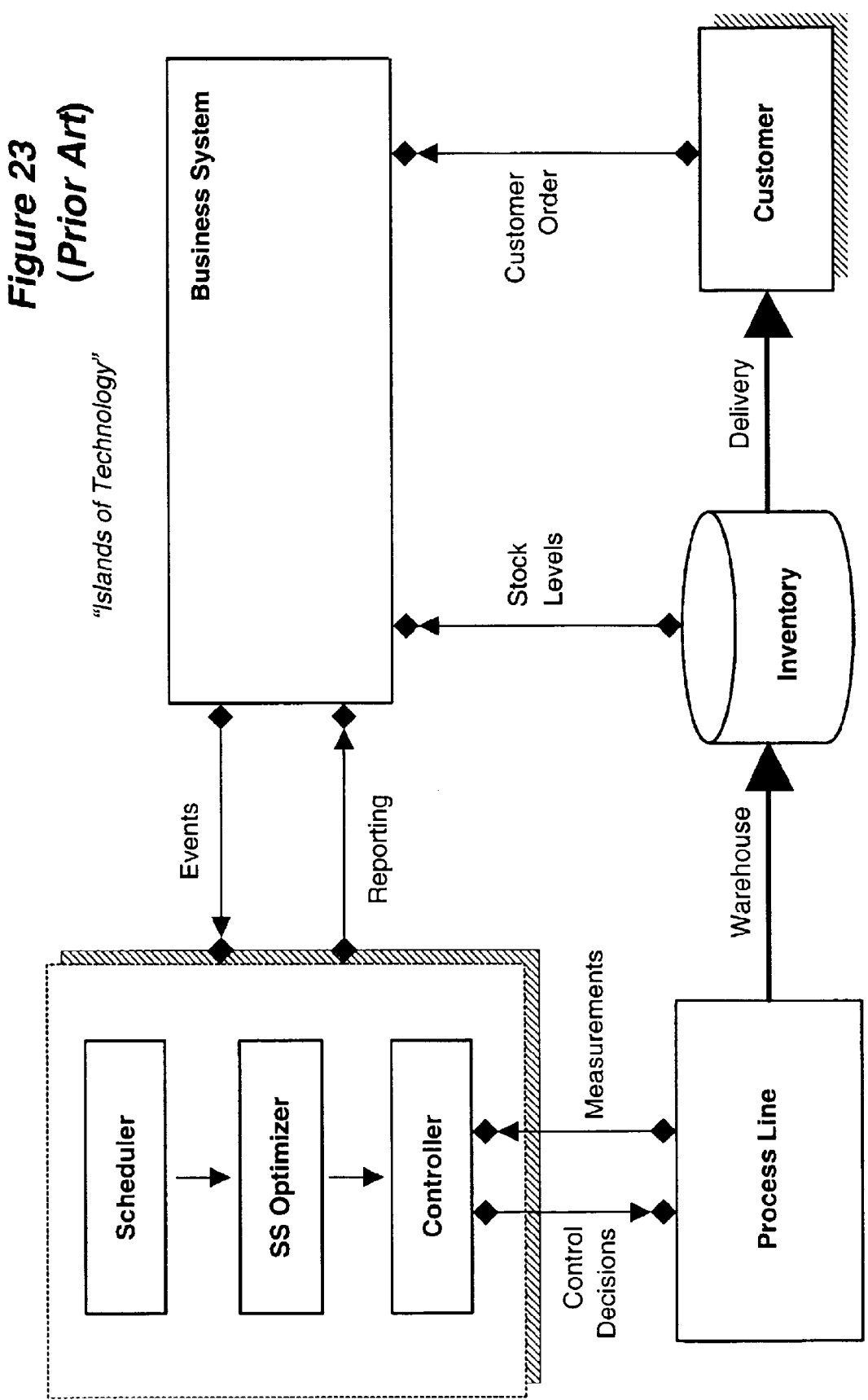
FIG. 23 illustrates the traditional prior art approach to scheduling/optimization problems.

FIG. 23—Traditional Approach to Scheduling/Optimization

FIG. 23 illustrates the traditional prior art approach to scheduling/optimization problems. As shown, and as noted above the prior art approach has typically used an "islands of technology" approach comprising separate applications, e.g., a separate scheduler application, separate optimizer application, and separate controller application. As shown, the scheduler application communicates with the optimizer application which in turn communicates with the controller application. The controller communicates with the process line to control the process being performed. Some of the drawbacks with this traditional approach is that each of the scheduler, optimizer and controller cannot take advantage of all of the enterprise data which would be desirable to optimize the entire enterprise. For example, the scheduler could not utilize inventory data in any type of real time fashion and also cannot utilize business system data. Thus, this traditional approach lacked an enterprise-wide view of the system. Further, these separate applications typically do not communicate with each other adequately to form an enterprise solution.

FIGS. 24–29: Process Coordinator

FIGS. 24–29 provide a description of an integrated process scheduling solution referred to as process coordinator. In one embodiment, process coordinator is designed as a manufacturing automation application that seamlessly incorporates the capabilities of advanced process control and recipe execution into a real time event triggered optimal scheduling solution. The process coordinator of this embodiment includes a number of innovations, including schedules based on real time information, unification of scheduling and controlled tasks, and blending of batch and continuous representations.

The process coordinator system of one embodiment of the invention operates to combine scheduling and control into a powerful hybrid environment. This operates to provide a more enterprise-wide view of the complete solution or system, enabling more intelligent scheduling and control since each of these layers understands the operation and needs of the other layer. Therefore, in the example of FIG. 22, scheduling would involve determining how much of a certain plastic component to make and at what time the plastic component should be made in order to meet customer demands, e.g., how many of the hard plastic is produced versus how much of the soft plastic is produced. The control task would involve actually controlling the production unit or process to make the chosen plastics to the right quality, right consistency and maintaining efficient operations, etc. As noted above, these two operations or decision/automation solutions were traditionally done almost in complete isolation. The process coordinator system of this embodiment operates to combine these into an integrated fashion, which allows much more intelligent scheduling and control.

Figure 24:
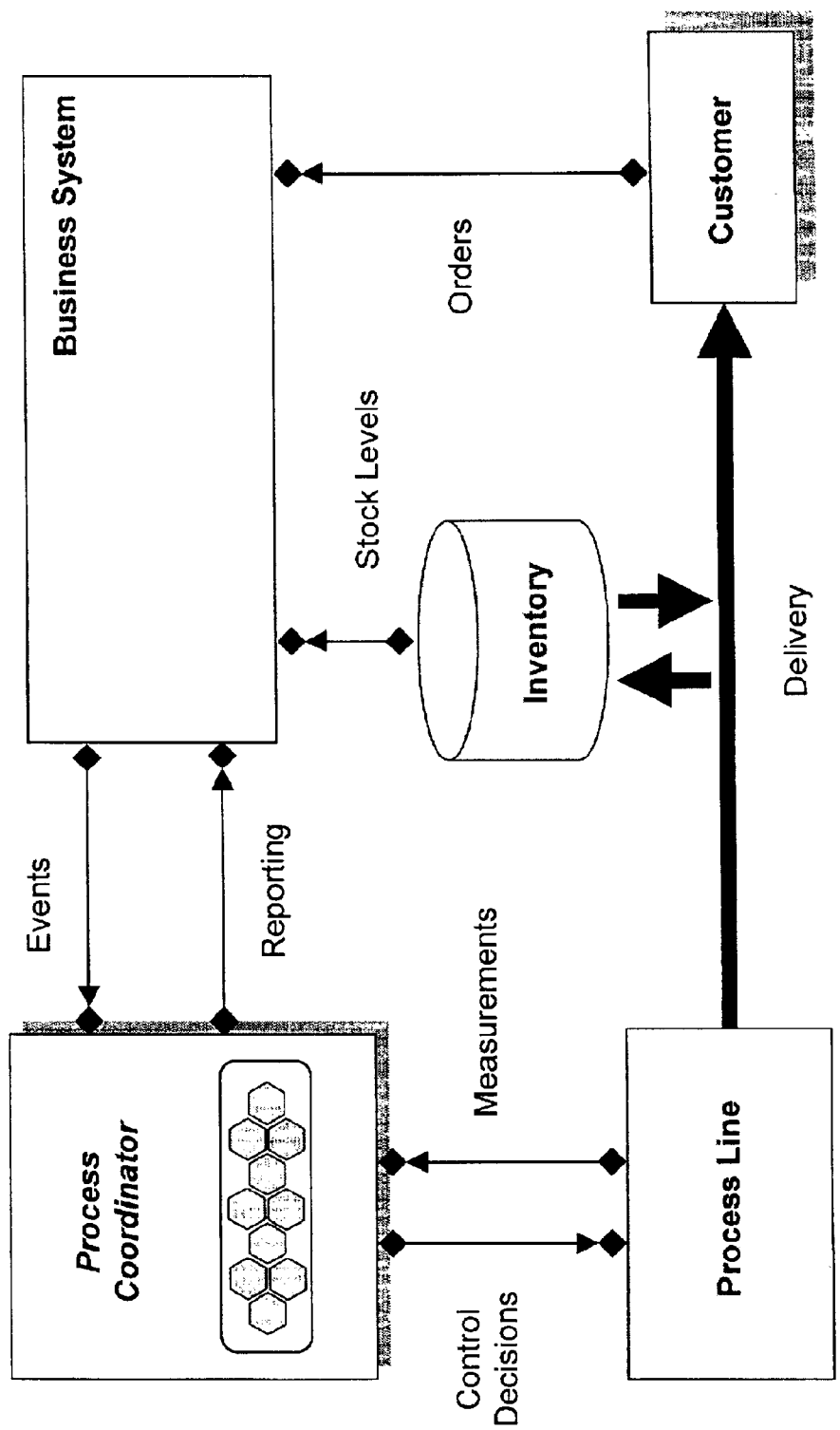
FIG. 24 illustrates an enterprise modeling/optimization system according to one embodiment of the present invention.

FIG. 24—Enterprise Modeling/Optimization

FIG. 24 illustrates an enterprise modeling/optimization system according to one embodiment of the present invention. As shown, this system includes a process coordinator which is comprised of or built of a plurality of primitive components. The primitive components represent building blocks used to create a modeling/optimization system. As discussed above, this building-block architecture enables the creation of a more integrated and enterprise-wide modeling/optimization system. As shown, the process coordinator, according to this embodiment, communicates with the process line inventory data and business system data to provide a more completely optimized enterprise-wide system.

Figure 25:
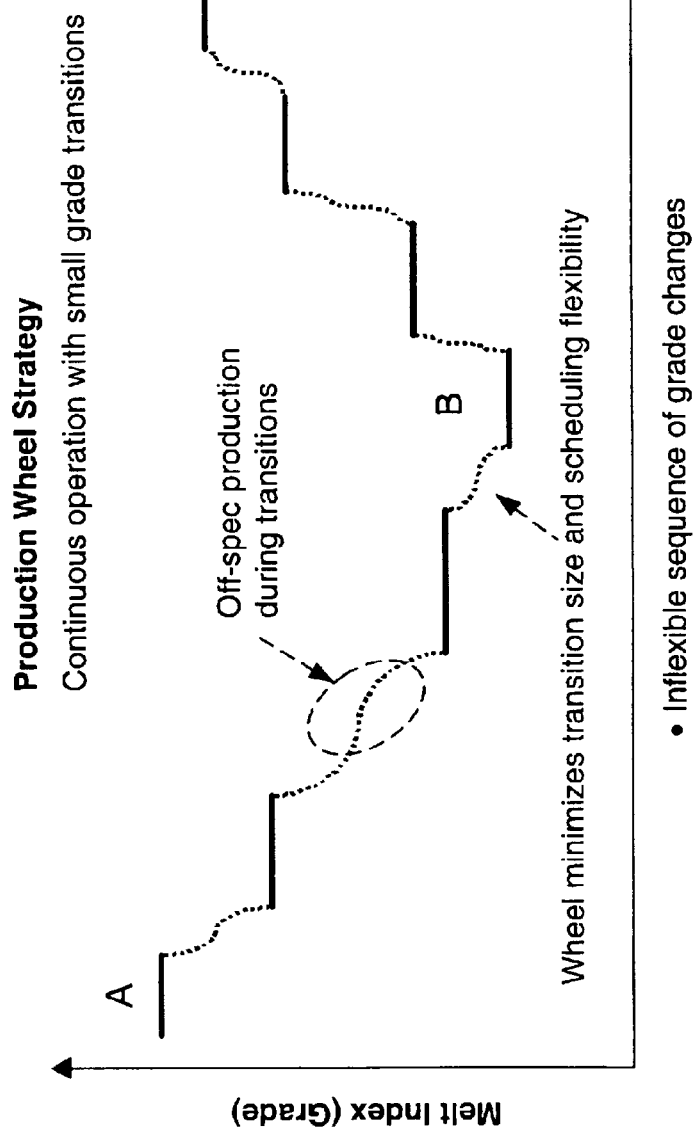
FIG. 25 illustrates a traditional production scheduling example according to the prior art.

FIG. 25—Prior Art Production Scheduling

FIG. 25 illustrates a traditional production scheduling example according to the prior art. FIG. 25 illustrates a production wheel for the above polymer problem. As shown, different grades of material are being produced at different times for different lengths of time. The scheduling problem has traditionally pre-assumed that the sequence will appear as an "oscillating wheel of production", and the only variables are the lengths of each of the production grades. The lengths of the production grades comprise how much product is made of that grade, e.g., how long the grade is made. A sequence list is typically maintained which indicates the grades to be produced.

As shown, a controller controls the plant in performing the transition from one grade to another. The behavior of the transition between grades is a function of both the process response and how the process is being controlled. However, knowledge of only the process response is inadequate to understand how that transition is going to occur. In general, a model of any control strategy that is being applied to that process may be needed in order to properly understand the transition. Furthermore, the control strategy may be changing over time based on operating conditions.

In prior art systems, the scheduling problem is traditionally performed with a static fixed cost matrix which defines the cost for a transition from any grade to any other. The scheduling problem finds the optimal lengths to meet demands subject to the cost associated with these transitions. However, these costs in the static fixed cost matrix are typically inaccurate and outdated, since they are typically generated a lengthy period of time prior to their use, e.g., 3 months ago.

Figure 26:
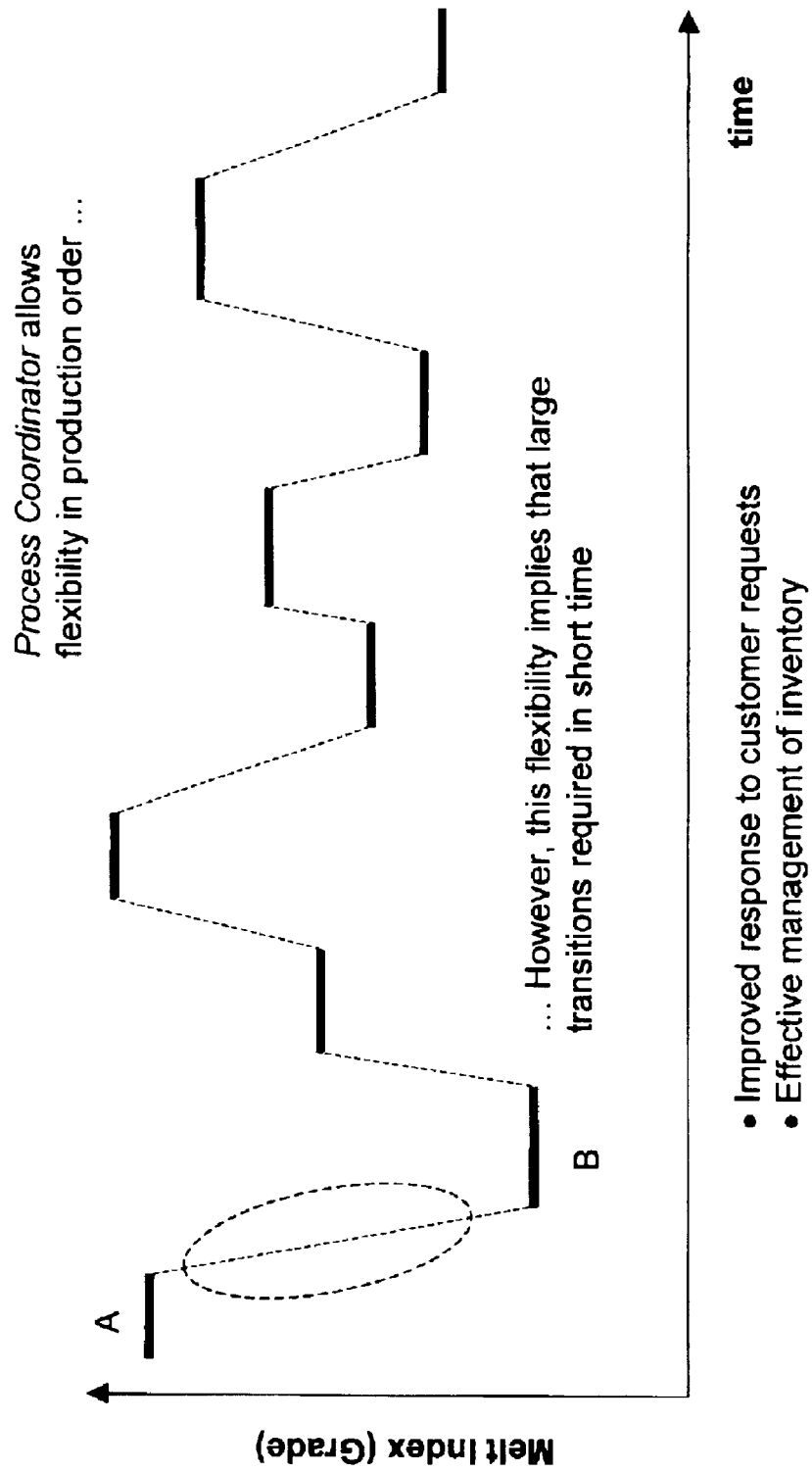
FIG. 26 illustrates flexible scheduling according to one embodiment of the invention.

FIG. 26—Flexible Scheduling

FIG. 26 illustrates flexible scheduling according to one embodiment of the invention. As shown, the process coordinator allows flexibility in production order, which may provide improved response to customer requests and more effective management of inventory.

One embodiment of the present invention operates to perform the scheduling optimization problem using real-time modeled cost information about how that transition will occur and the associated costs. Thus the system uses a model of the physical process, and a model of the control strategy, wherein the models include sufficient detail in order to be able to predict how the process will behave during transitions. The behavior of the process may be a mix of continuous and/or batch type of automation characteristics. Therefore, in one embodiment, as discussed further below, the system includes a modeling framework that subsumes both, i.e., that handles both continuous and batch characteristics. Thus, the system includes one modeling framework for both forms of modeling.

Thus, as described above, real cost information is used in performing the scheduling. In addition to this, the system and method can optimize the path itself as well as optimizing the order in which products or grades are produced. Thus the system can solve a combined path planning problem and scheduling problem.

In prior art systems, scheduling is performed with no knowledge of how the control is performed. In these prior art systems, the system must be very conservative in scheduling because the system can not capture the details of how the control system will actually respond. In the system described herein, scheduling and control functions are integrated, and the system can be much more aggressive about scheduling. As described further below, the scheduling solver may include an embedded model of the layer or model below, and the scheduling order may be updated as necessary based on this embedded model.

Thus the system operates to solve the scheduling problem subject to various types of dynamic constraints. Therefore, by integrating scheduling and control functions, the system of the present invention can perform more advanced modeling and optimization.

Figure 27:
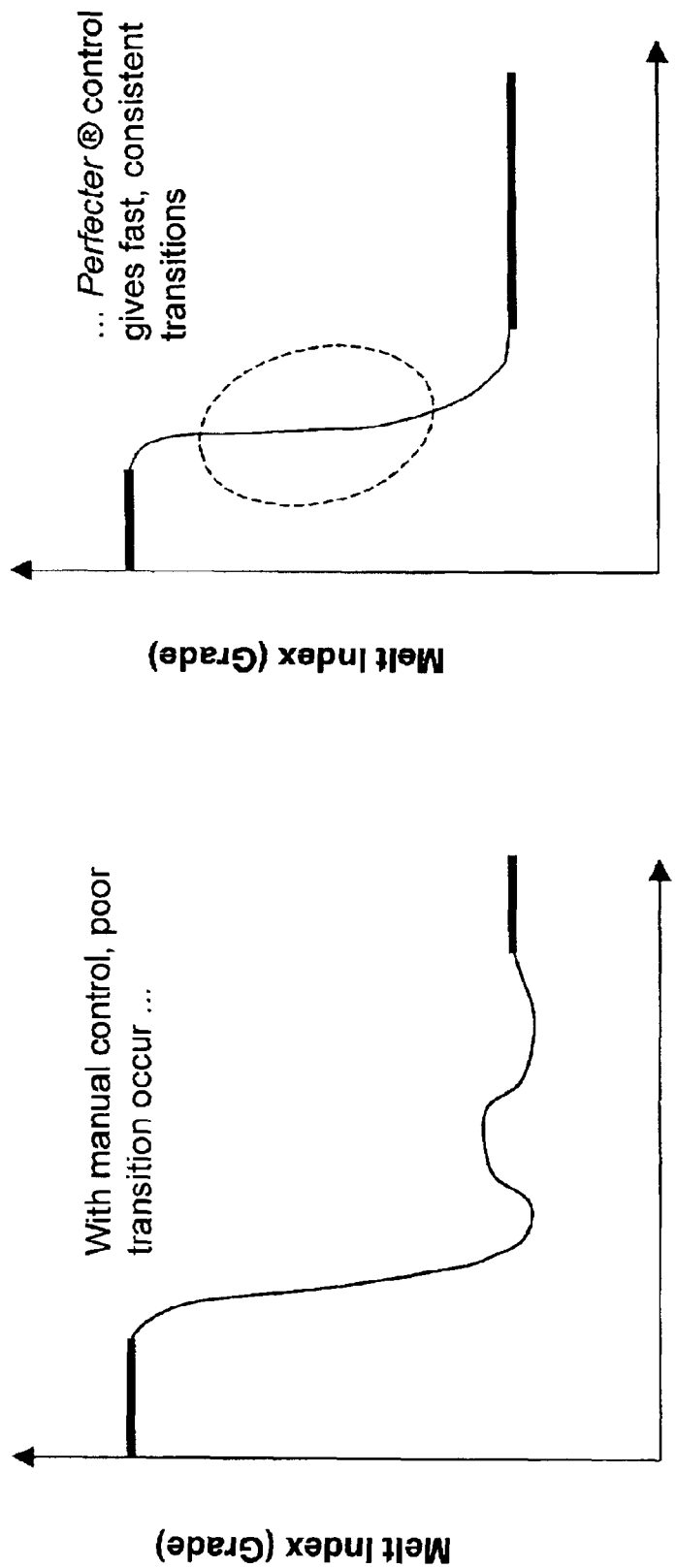
FIG. 27 illustrates the manner in which this embodiment of the invention may operate to control or enable flexible transitions.

FIG. 27—Flexible Transitions

FIG. 27 illustrates the manner in which this embodiment of the invention may operate to control or enable flexible transitions. FIG. 27 illustrates two graphs of melt index or grade versus time. As shown, with manual control, poor transitions may occur. As noted above, this embodiment may operate to combine nonlinear optimization and control and thus enable large rapid consistent transitions necessary for flexible scheduling. Thus, the control used according to this embodiment provides fast consistent transitions.

Figure 28:
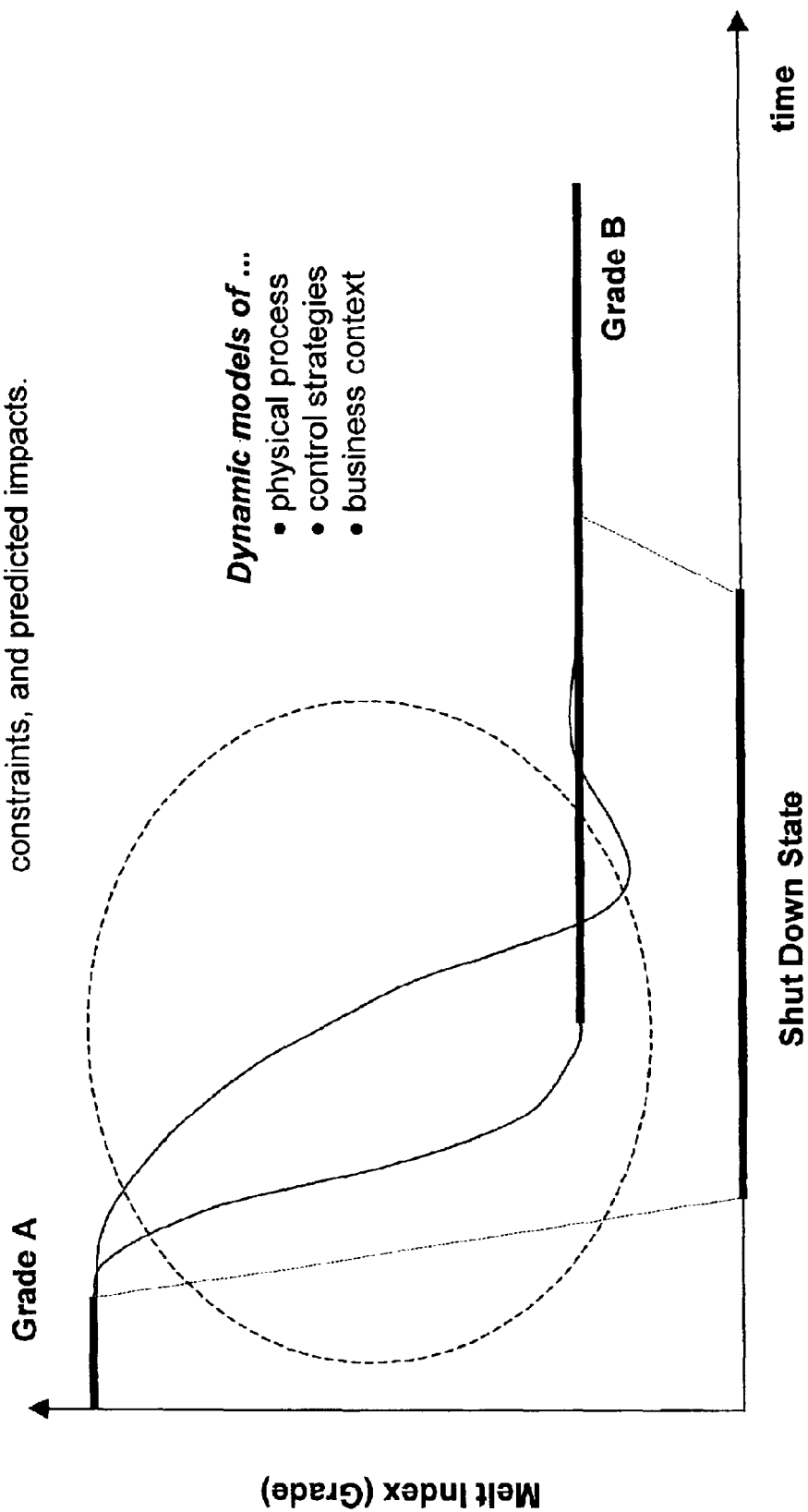
FIG. 28 illustrates the manner in which dynamic models provide behavior.

FIG. 28—Dynamic Models Provide Behavior

FIG. 28 illustrates the manner in which dynamic models provide behavior. FIG. 28 also illustrates a graph of melt index or grade versus time. As shown, unified dynamic models allow the process coordinator system to compute optimal decisions based on accurate costs, constraints and predicted impacts. The system utilizes dynamic models of one or more of physical process, control strategies and business context.

Figure 29:
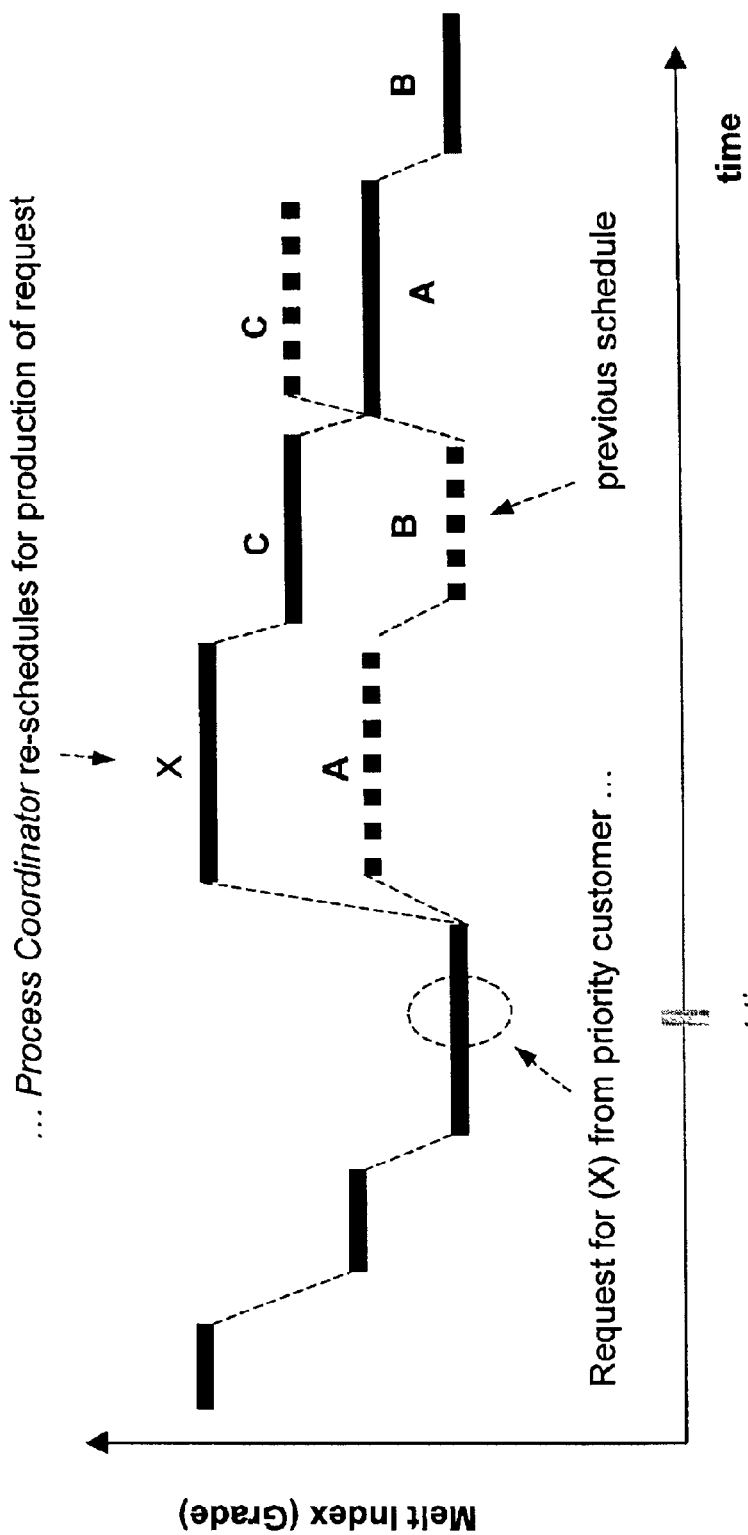
FIG. 29 illustrates the manner in which the system performs event triggered re-scheduling.

FIG. 29—Event Triggered Re-scheduling

FIG. 29 illustrates the manner in which the system performs event triggered rescheduling. As shown, the process coordinator system may operate to re-schedule grade production based on requests from priority customers. Thus, the process coordinator system may operate to abandon a previous schedule and adopt a new schedule based on production requests received from customers. Thus, downstream scheduling may be re-optimized based on this real time information. Further, the actual impact of this customer request fulfillment is known.

Therefore, the process coordinator system of this embodiment reduces production costs and inventory, enables dynamic customer response, can respond to unexpected events, and can compute accurate pricing and delivery time. Thus, the system leverages the flexibility of production assets.

CONCLUSION

The system of the present invention establishes the architectural framework for a plurality of enterprise-wide optimization products. This enterprise-wide solution combines all relevant information across the enterprise in order to make optimal decisions. The architecture is open, extendable, modular, scalable, maintainable, and rapidly re-configurable.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for enabling a user to create a program for controlling a process, wherein the method operates in a system including a computer system which is coupled to the process, the method comprising:

providing a plurality of software classes for modeling, optimization, and deployment;

providing one or more management facilities for managing the plurality of software classes;

creating a plurality of software objects based on the plurality of software classes, wherein said creating the plurality of software objects comprises creating a dynamic process model object and creating a solver object, wherein the dynamic process model object and the solver object comprise a first solution which controls a first process;

creating a model of the first solution;

creating a second solution, wherein the second solution comprises a second dynamic process model object, a second solver object, and the model of the first solution, wherein the second solution which operates to control a second process, wherein the second solution affects the first solution; and constructing an optimization program which uses the plurality of software objects, wherein said constructing is performed in response to user input;

wherein the optimization program is useable in controlling the process;

wherein the optimization program is constructed including the dynamic process model object and the solver object, wherein the dynamic process model object and the solver object operate together to optimize the process; and wherein the second solution uses the model of the first solution to determine how the first solution will respond to actions provided by the second solution.

2. The method of claim 1, wherein the plurality of software classes include at least one of a modeling class, a simulation class, and an optimization class.

3. The method of claim 1, wherein the plurality of software classes include at least two of a modeling class, a simulation class, and an optimization class.

4. The method of claim 3, wherein the plurality of software classes further include two or more of: a visualization class, a deployment class, an execution class, a configuration class, a communication class, a reporting class, a management class, an archiving class, a pre-processing class, and a post-processing class.

5. The method of claim 1, wherein the plurality of software classes include a modeling class and an optimization class;

wherein said creating the plurality of software objects comprises creating a modeling object and an optimization object;

wherein said constructing the optimization program comprises constructing the optimization program using the modeling object and the optimization object.

6. The method of claim 1, wherein the plurality of software objects are instances of two or more of the plurality of software classes;

wherein the plurality of software objects comprise primitives that are useable in creating higher level programs.

7. The method of claim 1, further comprising:

executing the optimization program, wherein said executing comprises executing the plurality of software objects to optimize the process.

8. The method of claim 7, wherein said executing the optimization program further comprises:

the plurality of software objects communicating with each other using event triggered execution.

9. The method of claim 1, wherein said constructing the optimization program comprises creating a decision engine, wherein the decision engine comprises an encapsulation of knowledge and decision making logic;

wherein the decision engine comprises two or more of a modeling object, a simulation object and an optimization object;

wherein the decision engine comprises a modular and portable component.

10. The method of claim 1, wherein the one or more management facilities comprise one or more of: a global naming facility, a storage and retrieval facility, a cataloging and location facility, a project grouping facility, a deployment facility, a revision tracking facility, and a visualization management facility.

11. The method of claim 1, wherein the optimization program is operable to perform optimization for two or more of: continuous processes, batch processes and discrete processes.

12. The method of claim 1, wherein the optimization program is operable to perform control functions for two or more of: continuous processes, batch processes and discrete processes.

13. The method of claim 1,
wherein said creating a plurality of software objects includes creating a model software object that combines a first-principles model and an empirical model.

14. The method of claim 1,
wherein said creating a plurality of software objects includes creating a model software object that combines two or more of: a first-principles model, an empirical model, and a procedural model.

15. The method of claim 1, wherein said creating a plurality of software objects further comprises:
creating a problem formulation object that describes a problem;
wherein the optimization program is constructed including the problem formulation object;
wherein the solver object uses information from the problem formulation object in optimizing the process.

16. The method of claim 1,
wherein the dynamic process model object comprises one of a first principles model, a linear model, a non-linear model, or a hybrid model;
wherein the solver object comprises one of a nonlinear programming solver, a mixed integer nonlinear programming solver, or an evolutionary solver.

17. The method of claim 1, wherein said creating a plurality of software objects further comprises:
creating a pre-processing object;
wherein the optimization program is constructed including the pre-processing object;
wherein the pre-processing object is operable to pre-process data prior to provision of the data to the dynamic process model object or the solver object.

18. The method of claim 1, wherein said creating a plurality of software objects further comprises:
creating a post-processing object;
wherein the optimization program is constructed including the post-processing object;
wherein the post-processing object is operable to post-process data received from one or more of the dynamic process model object or the solver object.

19. The method of claim 1, further comprising:
the second solution using the model of the first solution to dynamically determine how the first solution will respond to actions provided by the second solution; and
the second solution controlling the first solution based on a determination of how the first solution will respond to actions provided by the second solution.

20. The method of claim 1, further comprising:
creating a user interface component for the optimization program; and
associating the user interface component with the optimization program.

21. The method of claim 1, wherein the process comprises one of: an enterprise, a manufacturing operation, or an e-commerce system.

22. A control system for controlling a process, wherein the control system comprises:
a computer system including a processor and a memory medium, wherein the computer system is operable to couple to the process;
a plurality of software classes for modeling, optimization, and deployment;
one or more management facilities for managing the plurality of software classes;
a plurality of software objects created in response to the plurality of software classes, wherein the plurality of software objects inherit functionality from one or more of the plurality of software classes, wherein the plurality of software objects comprises a dynamic process model object and a solver object, wherein the dynamic process model object and the solver object comprise a first solution that controls a first process;
a model of the first solution;
a second solution, wherein the second solution comprises a second dynamic process model object, a second solver object, and the model of the first solution, wherein the second solution operates to control a second process, wherein the second solution affects the first solution; and
a control program created using the plurality of software objects;
wherein the control program is operable to control the process;
wherein the optimization program comprises the dynamic process model object and the solver object, wherein the dynamic process model object and the solver object operate together to optimize the process; and
wherein the second solution uses the model of the first solution to determine how the first solution will respond to actions provided by the second solution.

23. The control system of claim 22, wherein the plurality of software classes include at least two of a modeling class, a simulation class, and an optimization class.

24. The control system of claim 22, wherein the plurality of software classes further include two or more of: a visualization class, a deployment class, an execution class, a configuration class, a communication class, a reporting class, a management class, an archiving class, a pre-processing class, and a post-processing class.

25. The control system of claim 22, wherein the plurality of software classes include a modeling class and an optimization class;
wherein the plurality of software objects comprise a modeling object and an optimization object;
wherein the control program comprises the modeling object and the optimization object.

26. The control system of claim 22, wherein, during execution of the control program, the plurality of software objects communicate with each other using event triggered execution.

27. The control system of claim 22,
wherein the control program comprises a decision engine, wherein the decision engine comprises an encapsulation of knowledge and decision making logic;
wherein the decision engine comprises two or more of a modeling object, a simulation object and an optimization object;
wherein the decision engine comprises a modular and portable component.

28. The control system of claim 22, wherein the control program is operable to perform control functions for two or more of: continuous processes, batch processes and discrete processes.

29. The control system of claim 22, wherein the plurality of software objects further comprises a problem formulation object that describes a problem;
wherein the optimization program comprises the problem formulation object;
wherein the solver object uses information from the problem formulation object in optimizing the process.

30. The control system of claim 22,
wherein the dynamic process model object comprises one of a first principles model, a linear model, a non-linear model, or a hybrid model;
wherein the solver object comprises one of a nonlinear programming solver, a mixed integer nonlinear programming solver, or an evolutionary solver.

31. The control system of claim 22, wherein the plurality of software objects further comprises a pre-processing object;
wherein the optimization program comprises the pre-processing object;
wherein the pre-processing object is operable to pre-process data prior to provision of the data to the dynamic process model object or the solver object.

32. The control system of claim 22, wherein the plurality of software objects further comprises a post-processing object;
wherein the optimization program comprises the post-processing object;
wherein the post-processing object is operable to post-process data received from one or more of the dynamic process model object or the solver object.

33. The control system of claim 22,
wherein the second solution controls the first solution based on a determination of how the first solution will respond to actions provided by the second solution.

34. The control system of claim 22, further comprising:
a user interface component for the control program;
wherein the user interface component is operable to be associated with the control program.

35. The control system of claim 22, wherein the process comprises one of: an enterprise, a manufacturing operation, or an e-commerce system.

36. The control system of claim 22, wherein the control system comprises a plurality of computer systems interconnected via a network.

37. A method for enabling a user to create a program for controlling a process, wherein the method operates in a system including a computer system which is coupled to the process, the method comprising:
providing a plurality of software classes for modeling, optimization, and deployment;
providing one or more management facilities for managing the plurality of software classes; and
creating a plurality of software objects based on the plurality of software classes, wherein said creating a plurality of software objects comprises:
creating a dynamic process model object; and
creating a solver object;
wherein the dynamic process model object and the solver object comprise a first solution that controls a first process;
the method further comprising:
creating a second solution, wherein the second solution comprises a second dynamic process model object and a second solver object which operate together to control a second process, wherein the first solution affects the second solution;
creating a model of the second solution;
including the model of the second solution into the first solution, wherein the first solution uses the model of the second solution to determine how the second solution will respond to actions provided by the first solution; and constructing an optimization program which uses the plurality of software objects, wherein said constructing is performed in response to user input, wherein the optimization program is constructed including the dynamic process model object and the solver object, wherein the dynamic process model object and the solver object operate together to optimize the process.

38. The method of claim 37, wherein said creating a plurality of software objects further comprises:
creating a problem formulation object that describes a problem;
wherein the optimization program is constructed including the problem formulation object;
wherein the solver object uses information from the problem formulation object in optimizing the process.

39. The method of claim 37,
wherein the dynamic process model object comprises one of a first principles model, a linear model, a non-linear model, or a hybrid model;
wherein the solver object comprises one of a nonlinear programming solver, a mixed integer nonlinear programming solver, or an evolutionary solver.

40. The method of claim 37, wherein said creating a plurality of software objects further comprises:
creating a pre-processing object;
wherein the optimization program is constructed including the pre-processing object;
wherein the pre-processing object is operable to pre-process data prior to provision of the data to the dynamic process model object or the solver object.

41. The method of claim 37, wherein said creating a plurality of software objects further comprises:
creating a post-processing object;
wherein the optimization program is constructed including the post-processing object;
wherein the post-processing object is operable to post-process data received from one or more of the dynamic process model object or the solver object.

42. The method of claim 37, further comprising:
the first solution using the model of the second solution to dynamically determine how the second solution will respond to actions provided by the first solution; and
the first solution controlling the second solution based on a determination of how the second solution will respond to actions provided by the first solution.

43. The method of claim 37, further comprising:
creating a user interface component for the optimization program; and
associating the user interface component with the optimization program.

44. The method of claim 37, wherein the process comprises one of: an enterprise, a manufacturing operation, or an e-commerce system.

45. A method for enabling a user to create a program for controlling a process, wherein the method operates in a system including a computer system which is coupled to the process, the method comprising:
creating a first solution comprising a first dynamic process model and a first solver, wherein the first solution controls a first process;
creating a model of the first solution;
creating a second solution, wherein the second solution comprises a second dynamic process model, a second solver, and the model of the first solution, wherein the second solution controls a second process, wherein the second solution affects the first solution;

wherein the second solution uses the model of the first solution to determine how the first solution will respond to actions provided by the second solution.

46. The method of claim 45, further comprising:

the second solution using the model of the first solution to dynamically determine how the first solution will respond to actions provided by the second solution; and the second solution controlling the first solution based on a determination of how the first solution will respond to actions provided by the second solution.

47. A method for enabling a user to create a program for controlling a process, wherein the method operates in a system including a computer system which is coupled to the process, the method comprising:

creating a first solution comprising a first dynamic process model and a first solver, wherein the first solution controls a first process;

creating a second solution, wherein the second solution comprises a second dynamic process model and a second solver, wherein the second solution controls a second process, wherein the first solution affects the second solution;

creating a model of the second solution;

including the model of the second solution into the first solution;

wherein the first solution uses the model of the second solution to dynamically determine how the second solution will respond to actions provided by the first solution.

48. The method of claim 47, further comprising:

the first solution using the model of the second solution to dynamically determine how the second solution will respond to actions provided by the first solution; and the first solution controlling the second solution based on a determination of how the second solution will respond to actions provided by the first solution.

49. A memory medium comprising program instructions which are executable by a processor to:

provide a plurality of software classes for modeling, optimization, and deployment;

provide one or more management facilities for managing the plurality of software classes;

create a plurality of software objects based on the plurality of software classes, wherein, in said creating the plurality of software objects, the program instructions are further executable by the processor to create a dynamic process model object and create a solver object, wherein the dynamic process model object and the solver object comprise a first solution that controls a first process;

create a model of the first solution;

create a second solution, wherein the second solution comprises a second dynamic process model object, a second solver object, and the model of the first solution, wherein the second solution which operates to control a second process, wherein the second solution affects the first solution; and construct an optimization program which uses the plurality of software objects, wherein said constructing is performed in response to user input;

wherein the optimization program is useable in controlling the process;

wherein the optimization program is constructed including the dynamic process model object and the solver object, wherein the dynamic process model object and the solver object operate together to optimize the process; and wherein the second solution uses the model of the first solution to determine how the first solution will respond to actions provided by the second solution.

50. The memory medium of claim 49, wherein the plurality of software classes include at least one of a modeling class, a simulation class, and an optimization class.

51. The memory medium of claim 49, wherein the plurality of software classes include at least two of a modeling class, a simulation class, and an optimization class.

52. The memory medium of claim 51, wherein the plurality of software classes further include two or more of: a visualization class, a deployment class, an execution class, a configuration class, a communication class, a reporting class, a management class, an archiving class, a pre-processing class, and a post-processing class.

53. The memory medium of claim 49, wherein the plurality of software classes include a modeling class and an optimization class;

wherein, in said creating the plurality of software objects, the program instructions are further executable by the processor to create a modeling object and an optimization object;

wherein, in said constructing the optimization program, the program instructions are further executable by the processor to construct the optimization program using the modeling object and the optimization object.

54. The memory medium of claim 49, wherein the plurality of software objects are instances of two or more of the plurality of software classes;

wherein the plurality of software objects comprise primitives that are useable in creating higher level programs.

55. The memory medium of claim 49, wherein the program instructions are further executable by the processor to:

execute the optimization program, wherein, in said executing the optimization program, the program instructions are further executable by the processor to execute the plurality of software objects to optimize the process.

* * * * *